US011171781B2

(12) United States Patent
Khan

(10) Patent No.: US 11,171,781 B2
(45) Date of Patent: Nov. 9, 2021

(54) SYSTEM AND METHOD WHICH USING BLOCKCHAIN PROTECTS THE PRIVACY OF ACCESS CODE AND THE IDENTITY OF AN INDIVIDUAL SEEKING ONLINE ACCESS

(71) Applicant: Sal Khan, Ottawa (CA)

(72) Inventor: Sal Khan, Ottawa (CA)

( * ) Notice: Subject to any disclaimer, the term of this patent is extended or adjusted under 35 U.S.C. 154(b) by 0 days.

(21) Appl. No.: 16/040,986

(22) Filed: Jul. 20, 2018

(65) Prior Publication Data
US 2021/0273804 A1 Sep. 2, 2021

Related U.S. Application Data

(63) Continuation-in-part of application No. 15/044,055, filed on Feb. 15, 2016, now Pat. No. 10,171,476.

(51) Int. Cl.
H04L 9/32 (2006.01)
H04L 9/08 (2006.01)
H04W 12/72 (2021.01)

(52) U.S. Cl.
CPC .......... H04L 9/3213 (2013.01); H04L 9/0825 (2013.01); H04L 9/0869 (2013.01); H04L 9/3247 (2013.01); H04W 12/72 (2021.01); H04L 2209/38 (2013.01)

(58) Field of Classification Search
None
See application file for complete search history.

(56) References Cited

U.S. PATENT DOCUMENTS

| 2006/0074986 | A1* | 4/2006 | Mallalieu | G07C 9/37 |
| 2007/0245144 | A1* | 10/2007 | Wilson | G06Q 20/38215 713/170 |
| 2008/0046984 | A1* | 2/2008 | Bohmer | H04L 63/0853 726/5 |
| 2010/0194571 | A1* | 8/2010 | Ortiz | H04L 63/0861 340/572.1 |
| 2012/0199653 | A1* | 8/2012 | Wenzel | G07C 9/27 235/382 |
| 2014/0270336 | A1* | 9/2014 | Eckel | H04W 12/06 382/100 |
| 2015/0058931 | A1* | 2/2015 | Miu | G06F 21/6218 726/3 |
| 2015/0235215 | A1* | 8/2015 | Kumar | H04L 63/0823 705/44 |
| 2015/0319170 | A1* | 11/2015 | Grossemy | H04L 63/0861 713/186 |
| 2016/0065552 | A1* | 3/2016 | Chen | H04L 63/10 726/6 |

* cited by examiner

Primary Examiner — Kenny S Lin

(57) ABSTRACT

This invention relates to personal identity management and verifiable and authenticable methods and systems for mobile personal credentials. A critical problem is knowing the true identity of counterparties while using electronic messaging or conducting online transactions. Existing security measures can be bypassed when identity is presented in electronic form. The inventors address these issues by providing digital ID document in conjunction with data that permits the other party to verify ID. Further, the inventors either link the electronic ID to its physical counterpart or to the actual physical individual presenting the ID. Immutable digital ledger technology, such as blockchain, is used to provide trustworthy authentication of digital identity along with assurance that the identity presented belongs to the individual presenting it.

16 Claims, 11 Drawing Sheets

SYSTEM AND METHOD WHICH USING BLOCKCHAIN PROTECTS THE PRIVACY OF ACCESS CODE AND THE IDENTITY OF AN INDIVIDUAL SEEKING ONLINE ACCESS

FIELD OF THE INVENTION

This invention relates to personal identity management and more particularly to methods and systems for mobile personal credentials that are verifiable and authenticable.

BACKGROUND OF THE INVENTION

Digital identity is the data that uniquely describes a person or a thing and contains information about the subject's relationships within the digital world, commonly referred to as cyberspace, World Wide Web (WWW) or Internet. A critical problem is knowing the true identity with whom one is interacting either within electronic messaging, Internet accessible content, or transaction. Currently there are no ways to precisely determine the identity of a person in digital space. Even though there are identity attributes associated to a person's digital identity, these attributes or even identities can be changed, masked or dumped and new ones created. Despite the fact that there are many authentication systems and digital identifiers that try to address these problems, there is still a need for a unified and verified identification system. Further, there are still the needs for respecting the privacy of individuals, maintaining security of the elements of a digital identity and associating.

With the advent of widespread electronic devices, the landscape for the identity (ID) documents industry has been rapidly changing with increasingly sophisticated security measures, increased electronic processing, global wireless network connectivity, and continuously expanding machine readable capabilities globally. These have evolved in order to counter the increasingly sophisticated counterfeiting and piracy methodologies that exploit the very same advances in technology and infrastructure. At the same time user expectations from ubiquitous portable electronic devices, global networks, etc. is for simplified security processes and streamlined authentication of an ID document, the user, or a transaction by the user.

Security features of ID documents currently in use globally include visual security features, machine-readable security features, and embedded passive or active electronic circuits. Visual Security Features provide easy visual control of ID documents and make them more resistant to counterfeiting and tampering through attempts at both physical and data changes. Machine-readable Security Features traditionally include magnetic stripes, 1D and 2D barcodes, Optical Character Recognition (OCR)/Optically Machine Readable (OMR) content in printed areas or Machine Readable Zones (MRZs). More advanced ID documents may also include contact and contactless interface microchips including RFID and smart cards. Such Machine-readable Security Features have varying memory capacity and typically replicate digitally the document data with additional unique identifiers and, in the case of microchips with sufficient data storage capabilities, additional biometric identification data for holder authentication may be included.

However, many if not all of these security measures are bypassed, eliminated, or reduced in their efficacy when the ID document is also provided in an electronic format upon a user's portable electronic device. Such a transitioning of traditional physical ID documents to their electronic "virtual" counterparts is anticipated to follow the current transitioning of user's financial credentials into the virtual world allowing users to pay for services and/or goods within retail environments by direct wireless communications between their portable electronic device and the point of sale terminal. However, the tampering of ID documents which would be visible upon the physical ID document can be rendered invisible within the electronic ID document with relative ease and with a variety of online and/or downloadable graphics editing tools etc. Accordingly, the requirement exists to provide third parties with the ability to verify the electronic version of an ID document being presented to them as being valid and untampered.

Accordingly, the inventors address these issues through the provisioning of electronic ID documents which when presented to a third party are associated with provisioning of data to the third party that allows them to verify the presented electronic ID document. Further, the inventors by linking the electronic ID document to its physical ID document counterpart or tying the electronic ID document to the physical individual provide authenticable electronic ID documents.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to real world and virtual world identities and more particularly to authenticating users within the virtual world based upon credentials issued in response to validated and authenticated real world identities.

According to an embodiment of the invention there is provided a method comprising:

providing verification of an individual to a third party during a transaction by providing to the third party data representing a predetermined portion of an originally issued identity document in conjunction with a unique image; and storing data relating to the transaction within an immutable digital ledger such as a blockchain, wherein the individual provides at least one of the predetermined portion of the originally issued identity document and the originally issued identity document during the verification process;

the unique image is transmitted to the third party from a remote server in response to a request initiated by the third party.

According to an embodiment of the invention there is provided method to verifying the identity of a user performing a transaction by storing data relating to an originally issued identity document within an immutable digital ledger such as a blockchain remotely stored upon a server remote to both a system performing the transaction and a system upon which data relating to the originally issued identity document is stored by the original issuing authority.

According to an embodiment of the invention there is provided method of providing data relating to a transaction performed by a user for use in a subsequent verification of the user in another transaction wherein the data is a hash value generated in dependence upon transaction data and a variable provided from an application in execution upon an electronic device associated with the user and the hash value is stored within an immutable digital ledger such as a blockchain.

According to an embodiment of the invention there is provided method of verifying the identity of a user comprising extracting data from at least a pair of immutable digital ledgers such as blockchains, the first digital ledger established by an issuer of an original identity document relating to the user and the second digital ledger established by a third party associated with at least a transaction performed by the user.

According to an embodiment of the invention there is provided a method to verifying the identity of a user performing a transaction by storing data relating to an identity verification score of the user within an immutable digital ledger such as a blockchain storing transaction data relating to transactions performed by the user.

According to an embodiment of the invention there is provided a method comprising providing to a user a smart contract with respect to the storage of information relating to the user based upon the user presenting an item of photographic identification as proof of identity with respect to an activity.

According to an embodiment of the invention there is provided a method comprising:

providing to a user a smart contract with respect to the storage of information relating to the user based upon the user presenting an item of Government issued photographic identification as proof of identity with respect to an activity;

obtaining informed consent from the user by their acceptance of the smart contract; and providing via at least one of tokenization and encryption linkage of the user's identity attributes associated with the item of Government issued photographic identification to the at least one of a financial instrument and a financial account of the user, wherein the at least one of the financial instrument and a financial account of the user are employed in completing the activity.

According to an embodiment of the invention there is provided a method comprising:

providing to a user a smart contract with respect to the storage of information relating to the user based upon the user presenting an item of Government issued photographic identification as proof of identity with respect to an activity;

obtaining informed consent from the user by their acceptance of the smart contract; and storing the linkage between the user's identity attributes associated with the item of Government issued photographic identification and the at least one of a financial instrument and a financial account of the user within a permissionless distributed database based upon a protocol, wherein the at least one of the financial instrument and a financial account of the user are employed in completing the activity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
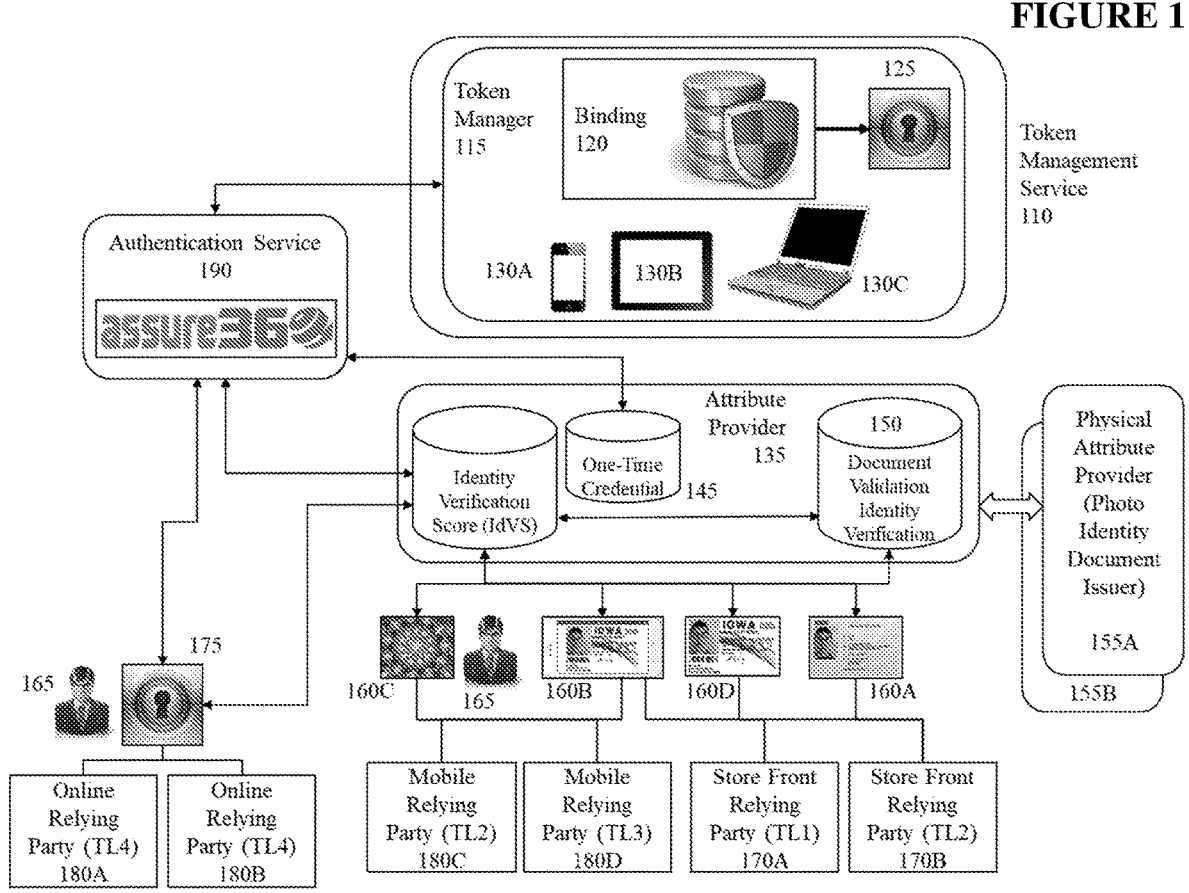
FIGS. 1 and 2 depict a first portion of a real world and virtual world identity ecosystem according to an embodiment of the invention.

The present invention is directed to real world and virtual world identities and more particularly to authenticating users within the virtual world based upon credentials issued in response to validated and authenticated real world identities.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a tablet, a smartphone, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, client, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals an/or a device comprising a microprocessor wherein the consumer and/or customer engages the third party but the actual service and/or product that they are interested in and/or purchase and/or receive is provided through an enterprise and/or service provider.

A "user" or "credential holder" as used herein refers to an individual who, either locally or remotely, by their engagement with a service provider, third party provider, enterprise, social network, social media etc. via a dashboard, web service, website, software plug-in, software application, or graphical user interface provides an electronic credential as part of their authentication with the service provider, third party provider, enterprise, social network, social media etc. This includes, but is not limited to, private individuals, employees of organizations and/or enterprises, members of community organizations, members of charity organizations, men, women, children, and teenagers. "User information" as used herein may refer to, but is not limited to, user identification information, user profile information, and user knowledge.

A "security credential" (also referred to as a credential) as used herein may refer to, but is not limited to, a piece of evidence that a communicating party possesses that can be used to create or obtain a security token. This includes, but is not limited to, a machine-readable cryptographic key, a machine-readable password, a cryptographic credential issued by a trusted third party, or another item of electronic content having an unambiguous association with a specific, real individual. Such security credentials may include those that are permanent, designed to expire after a certain period, designed to expire after a predetermined condition is met, or designed to expire after a single use.

A "government issued photographic identity document" as used herein may refer to, but is not limited to, any document, card, or electronic content item issued by a government body for the purposes of identifying the owner of the government issued photographic identity document. Such government bodies may, for example, be provincial, federal, state, national, and regional governments alone or in combination. Such government issued photographic identity documents, also referred to within this specification as Photo-ID cards, government issued photographic cards, and government issued identity documents may include, but are not limited to, a driver's license, a passport, a health card, national identity card, and an immigration card although they have the common feature of a photographic image, multimedia image, or audiovisual image of the user to whom the government issued photographic identity document was issued. Such government issued photographic identity documents may include, but not be limited to, those comprising single sided plastic card, double sided plastic cards, single sided sheets, double side sheets, predetermined sheets within a book or booklet, and digital representations thereof in isolation or in combination with additional electronic/digital data that has been encoded/encrypted. For example, a digital memory with fingerprint scanner in the form of what is known as a "memory stick" may be securely issued by a government body as the fingerprint data for the user is securely encoded and uploaded together with image and digital content data. Subsequently, the digital memory when connected to a terminal and activated by the user's fingerprint may transfer the required digital data to the terminal to allow for a verification that the user is the one and the same. Such memory devices can be provided which destroy or corrupt the data stored within upon detection of tampering.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as those for example listed on Wikipedia (see http://en.wikipedia.org/wiki/List_of_file_formats). Within a broader approach digital content may include any type of digital information that is at least one of generated, selected, created, modified, and transmitted in response to a request, wherein said request may be a query, a search, a trigger, an alarm, and a message for example.

"Encryption" as used herein may refer to, but are not limited to, the processes of encoding messages or information in such a way that only authorized parties can read it. This includes, but is not limited to, symmetric key encryption through algorithms such as Twofish, Serpent, AES (Rijndael), Blowfish, CAST5, RC4, 3DES, and IDEA for example, and public-key encryption through algorithms such as Diffie-Hellman, Digital Signature Standard, Digital Signature Algorithm, ElGamal, elliptic-curve techniques, password-authenticated key agreement techniques, Paillier cryptosystem, RSA encryption algorithm, Cramer-Shoup cryptosystem, and YAK authenticated key agreement protocol.

An immutable digital ledger as used herein may refer to, but are not limited to, a permissionless distributed database based on a protocol, such as the bitcoin blockchain protocol for example. An immutable digital ledger maintains and establishes a continuously growing list of transactional data records hardened against tampering and revision, even by operators of the data store's nodes themselves. Each record in an immutable digital ledger may be enforced cryptographically and hosted on machines working as data store nodes in a distributed manner.

The dual purposes of ID documents are to ascertain the virtual identity of the holder through providing a valid and authentic document, and also for a human authorized agent to identify the physical person as the rightful owner of the document, therefore binding in-person the physical identity to the virtual one. Whilst most security features are targeted at validating or increasing confidence in the authenticity of the ID document itself the second aspect of visual verification is subject to human limitations such as fatigue as well as variations in individual, environmental, and physical conditions. This is normally remedied by supplementing human validation with sophisticated equipment such as ID document scanners, or cameras that perform automated OCR/OMR and data cross-checking, providing some level of validation automation. Further, given many security features involve micro-printing, NIR or UV markings, RFID, and smartcard microchips, it is safe to say that only such equipment can reliably read these and validate certain aspect of these. Within U.S. Provisional Patent Application 61/980, 785 entitled "Methods and Systems relating to Real World Document Verification" filed Apr. 17, 2014 and 61/972,495 entitled "Methods and Systems relating to Real World and Virtual World Identities" filed Mar. 13, 2014, the entire contents of which are incorporated herein by reference, the inventors have presented a methodology and systems for uniquely verifying a physical ID card by establishing unique ID cards that are bound to a user's identity by an issuing authority. Accordingly, prior art identity replication and/or theft methodologies are halted as even a complete re-printing and re-programming of the ID card cannot remove the original binding of the ID card to an individual. However, it would be beneficial to expand the ID documents that could be protected by such unique bindings at issuance.

Conversely, the task of validating the physical identity of the ID document holder with the photo on the document, or the photo on another document of the same name such as a government issued ID, is optimally suited to the human agent today. As a biometric identifier, the matching of a user photo to their face is easily and quickly performed in person whereas with the current status of electronic solutions this is something more difficult to achieve reliably with facial recognition and face matching technology.

Accordingly, it would be beneficial for improved focus to be applied to photographic images within ID documents. As will become evident embodiments of the invention provide solutions supporting enhanced photographic and/or digital imagery to ensure enhanced usability for both visual authentication and easy readability without requiring high cost scanning or camera devices, allowing within the supported embodiments entirely digital mobile ID documents. Accordingly, embodiments of the invention may cross easily into the all-digital world whereas nearly all other prior art security features require a physical card making them self-limiting when considering migration to electronic ID documents and forcing adoption of secondary methodologies and credentials.

Figure 2:
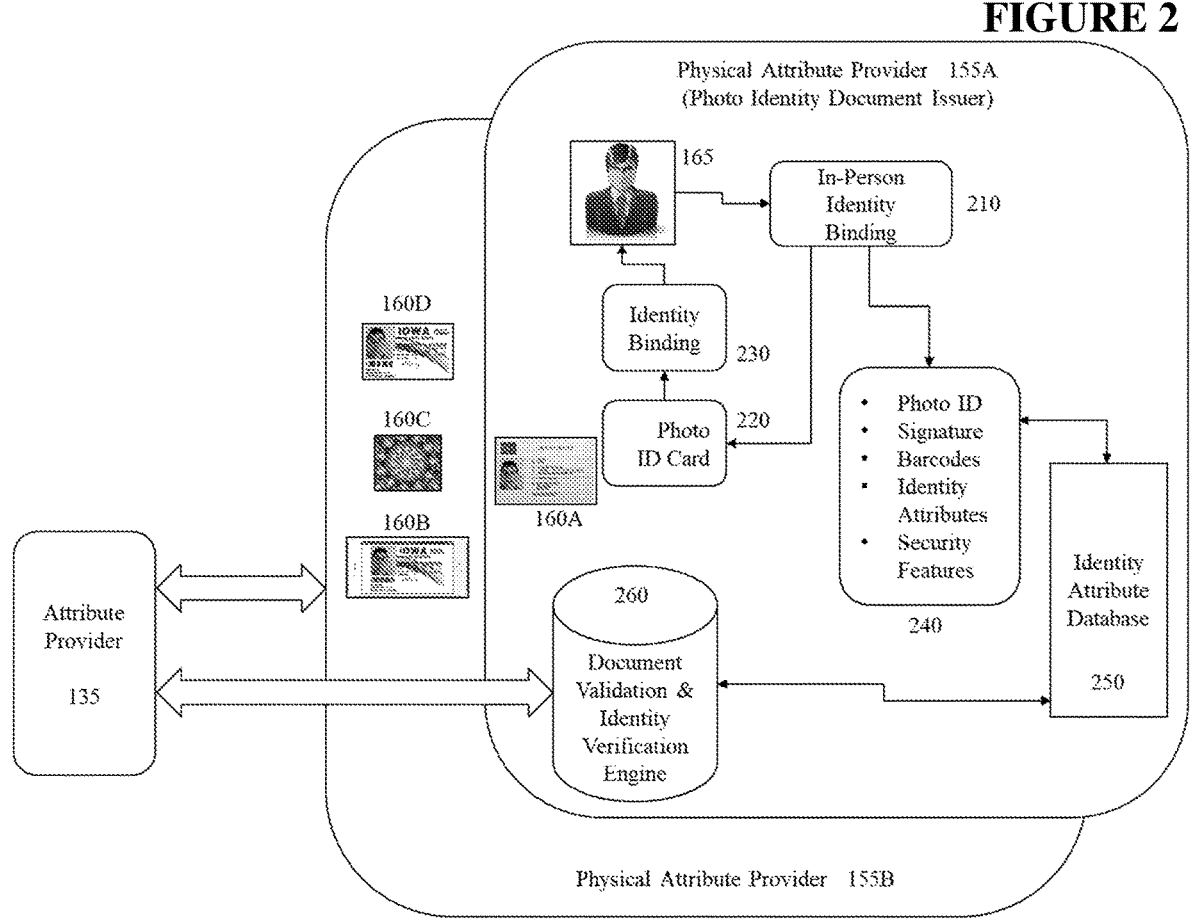

Referring to FIGS. 1 and 2 there are depicted first and second portions of a real and virtual world identity ecosystem (RVWIE) according to an embodiment of the invention. As depicted in FIG. 1 this RVWIE comprises a physical attribute provider (PHYSAP) 155 in communication with an Attribute Provider 135. The PHYSAP 155 being depicted schematic as process flow detail in FIG. 2. The PHYSAP 155 represents an identity document issuer wherein the identity document (ID) includes a photograph of the user 165 to whom it relates and may be a physical ID document and/or an electronic ID document. Accordingly, the PHYSAP 155 is, typically, a government issuing authority or an authority licensed by a government to issue identity documents. The government authority may be national, provincial, federal, or state for example. Such identity documents may include, but are not limited to, a driver's license, a passport, a health card, national identity card, and an immigration card.

Accordingly, a credential holder (user 165) is identity-proofed in-person by a trusted agent of the government photographic identity issuing authority, e.g. first and second PHYSAPs 155A and 155B. This process step 210, as depicted with respect to first PHYSAP 155A, results in the issuance of photographic identity (Photo-ID) document (PhysID) 160A (step 220) and the credential holder's proofed identity being bound (step 230) to the government photographic identity document. As a result of this sequence the credential holder's identity-proofed attributes being stored in step 240 within a government Identity Attribute Database 250 managed by the document issuer. Attributes stored in respect of the credential holder within the Identity Attribute Database 250 may include, but not be limited to, the photograph of the user 165, the signature of the user 165, the user's name and address, type of document, and date of issue. The information within the Identity Attribute Database 250 is also accessible by a Document Validation and Identity Verification Engine (DVIVE) 260 which is in communication with an Attribute Provider 135. In contrast, with second PHYSAP 155B, a similar process as depicted with respect to first PHYSAP 155A may be employed, resulting in a second PhysID 160D, electronic ID document (EleID) 160B, and fractal 160C. The fractal 160C may, for example be a fractal image or be a fractal image with embedded encrypted data such as described by the inventors within U.S. Provisional Patent Application 62/086,745 entitled "Verifiable Credentials and Methods Thereof" filed Dec. 3, 2014 the entire contents of which are incorporated herein by reference.

Subsequently, the user 165 (credential holder) uses their PhysID 160A, or second PhysID 160D at a storefront retailer/government office or kiosk/enterprise, depicted as first and second store front relying parties 170A and 170B respectively, to identify themselves in the presence of an agent of the store front relying party. The first and second store front relying parties 170A and 170B each exploit a Photo-ID checker, referred to within this specification as a Ping360 system/device. According to the identity of the first and second store front relying parties 170A and 170B respectively these are allocated different trust levels. For example:

Trust Level 1 (TL1)—government office, civic authority, e.g. another government Photo-ID issuing authority or government/civic office where the credential holder's identity is proofed, having higher trust level than other relying parties.

Trust Level 2 (TL2)—financial institutions, e.g. a bank, having a higher trust level than other relying parties, such as retailers, etc. but not at a level not as high as relying parties at a Trust Level 1.

Trust Level 3 (TL3)—all other identity agents, not included in the above trust levels 1 and 2 respectively.

An additional trust level, Trust Level 4 (TL4), is associated with online merchants as indicated in FIG. 1 with first and second online relying parties 180A and 180B respectively. This trust level, TL4, may also be associated with online activities with a government, government regulated body, online enterprise etc. Whilst embodiments of the invention are described as having four trust levels (TL1 to TL4 respectively) it would be evident that within alternate embodiments a higher or lesser number of trust levels may be employed. However, for each trust level the activities of a user are tracked and stored within the databases as described with respect to embodiments of the invention and employed as described below in generating an Identity Verification Score for the user with the government issued photographic identity document.

In some instances, such as a financial institution then some may be in one trust level whereas others may be in another. For example, an internationally recognized bank may be TL2 whereas a bank associated with a grocery retailer may be TL3 or TL4. Equally, a main branch of Bank of America may be TL2 versus a small in-mall branch at TL3 or T14. It would be evident that even within a trust level that a further hierarchy of trust may exist such that a US Post Office may have higher trust levels than a car rental company.

Whilst embodiments of the invention are described as having four trust levels (TL1 to TL4 respectively) it would be evident that within alternate embodiments a higher or lesser number of trust levels may be employed. The Ping360 system, located at the store front relying party's place of business and not shown for clarity, interacts with the Attribute Provider 135 to validate the PhysID 160A and verify the identity of the document bearer, user 165. Accordingly, the Ping360 system acquires data from and about the PhysID 160A and communicates this to a Document Validation Identity Verification database (DVIVDb) 150 which then communicates with the DVIVE 260 within the PHYSAP 155. The DVIVE 260 thereby confirms or denies the validity of the PhysID 160A presented by the user 165 at the one of the first and second store front relying parties 170A and 170B respectively. The DVIVE 260 extracts data from the Identity Attribute Database 250 as part of the validation activity.

Accordingly, the Ping360 system validates the PhysID 160A as being genuine or counterfeit. As described supra the Ping360 system extracts characteristic information from the PhysID 160A which is transmitted to the DVIVDb 150 managed and controlled by Attribute Provider 135. The extracted characteristics are then provided to DVIVE 260 wherein they are compared with data extracted from Identity Attribute Database 250 and a resulting validation/denouncement of the PhysID 160A is communicated back to the DVIVDb 150 and therein back to the Ping360 for presentation to the agent of the store front relying party. Extracted characteristics may include, but are not limited to, the photograph on the PhysID 160A, a signature, identity information of the PhysID 160A, barcode data, QR code data, data within magnetic stripe(s), etc. as well as potentially characteristics of the card itself.

The data within the Identity Attribute Database 250 maintained and acquired/generated by the PHYSAP 155 relating to the PhysID 160A when the user 165 applied for, or renewed, their PhysID 160A. Accordingly, the user 165 during the course of doing business at various retail service provider's locations, the credential holder's (user 165) PhysID 160A is validated and their identity verified by Attribute Provider's 135 DVIVDb 150. Therefore, each time the user's 165 PhysID 160A (or Photo-ID document) is validated and the bearer's identity is verified by the combination the Ping360 system, DVIVDb 150, and DVIVE 260 as being genuine and not fake, then the credential holder's in-person verified identity is also confirmed as being genuine. The Attribute Provider 135 also generates one or more Identity Verification Scores (IdVS) which are subsequently stored within an Identity Verification Score database 140. As a result, Ping360 software is able to generate a quantified measure of the credential holder's identity and inform participating businesses, employers, and organizations of the strength of the credential holder's identity.

An Identity Verification Score (IdVS) may be considered to be similar to a FICO score, which is used by financial institutions to help them make complex, high-volume decisions and grant credit to a user. As described in more detail below, and as established supra, in order to create a representative IdVS for each credential holder (user 165), where their PhysID 160A is verified by a Ping360 system, a trust level (TL) for each storefront relying party (Identity Agent) is established as outlined supra in dependence upon the storefront retailing party class, e.g. financial institutions have higher trust level than a retailer but not as high as a government office or civic authority office. In addition to trust level an IdVS computation according to embodiments of the invention may take into account the number of times the credential holder's photo-ID document is validated and the credential holder's identity verified.

As depicted in FIG. 1 IdVS data is also available for use by online relying parties, such as first and second online relying parties 180A and 180B respectively who may also act as identity agents for Attribute Provider 135. It is also available for use by online authentication services, such as for example, Authentication Service 190 depicted as Assure 360 Identity Assurance Service. The user 165, upon being verified through PHYSAP 155, may establish an account with an Attribute Provider 135 by forwarding an electronic mail address through an Identity Agent, depicted within FIG. 1 by first and second store front relying parties 170A and 170B respectively, via a Ping360 display, e.g. a tablet electronic device. The user 165 may have the ability to choose an Attribute Provider 135 from multiple Attribute Providers 135 as part of the process performed through an Identity Agent where they provide their electronic mail address. Optionally, the ability of a user 165 to communicate with and/or open an account with an Attribute Provider 135 may be restricted to a store front relying party at only one or more trust levels, e.g. those with trust level 1 (TL1) only for example. Additionally, the user 165 may be prevented from accessing an Identity Agent to establish the account with an Attribute Provider 135 until at least one or a predetermined number of activities have been completed with the store front relying parties at the appropriate trust levels. Further, the Identity Agent may only be accessed by the user 165 upon an authentication of their identity at the store front relying party by an action of an agent of the store front relying party.

The user 165 may then select an Authentication Service 190 from those provided by the Attribute Provider 135 web site of the Attribute Provider 135 the user 165 has selected. The Attribute Provider 135 sends a one-time-credential retrieved from One-Time Credential database 145 to the selected Authentication Service 190 and a credential 175 to the credential holder (user 165). Attribute Provider 135 also sends the Authentication Service 190 information required by the Authentication Service 190 to open an online account in the credential holder's name. Optionally, the user 165 may be presented with separate lists of Attribute Providers 135 and Authentication Services 190 during their establishment of the account or subsequently the user 165 may access any Authentication Service 190 rather than only a subset of them associated with the selected Attribute Provider 135. The credential holder can use the one-time credential sent by Attribute Provider 135 to identify themselves to the selected Authentication Service 190 to confirm the online account which was opened automatically on the credential holder's behalf by the Authentication Service 190 when the Authentication Service 190 received the one-time-credential and the credential holder's information necessary to open an account. Once the account with the Authentication Service 190 is active the credential holder can link their PED and/or FED to the Authentication Service 190's server by downloading the Authentication Service 190's client and related digital security certificates onto their PED and/or FED. A security certificate exchange takes place between the Authentication Service 190 and the Token Management Service 110, which may for example be upon a server associated with the Authentication Service 190 or may be upon a server associated with a third party. Accordingly, the Token Management Service 110 comprises a Token Manager 115 that binds, denoted by Binding 120, the digital security certificates 125 to the user's 160 PEDs/FEDs such as depicted by first to third devices 130A to 130C respectively.

As a result, the credential holder's identity is bound to the credential holder's PEDs and/or FEDs and to the Authentication Service 190/Token Management Service 110 thereby providing to one of the first and second online relying parties 180A and 180B respectively with strong authentication and Level 3, in-person, verified identity assurance. Based on the credential holder's IdVS, which is obtained from Identity Verification Score database 140 the Attribute Provider 135 can provide Authentication Service 190, and other authentication services, with revocation status information on the credential holder. Accordingly, the Authentication Service 190 may revoke, cancel, or not authenticate the security credential 175 of the user 165. It would be evident that in some embodiments of the invention the Authentication Service 190 does not retain or store the one-time credentials 175.

Figure 3:
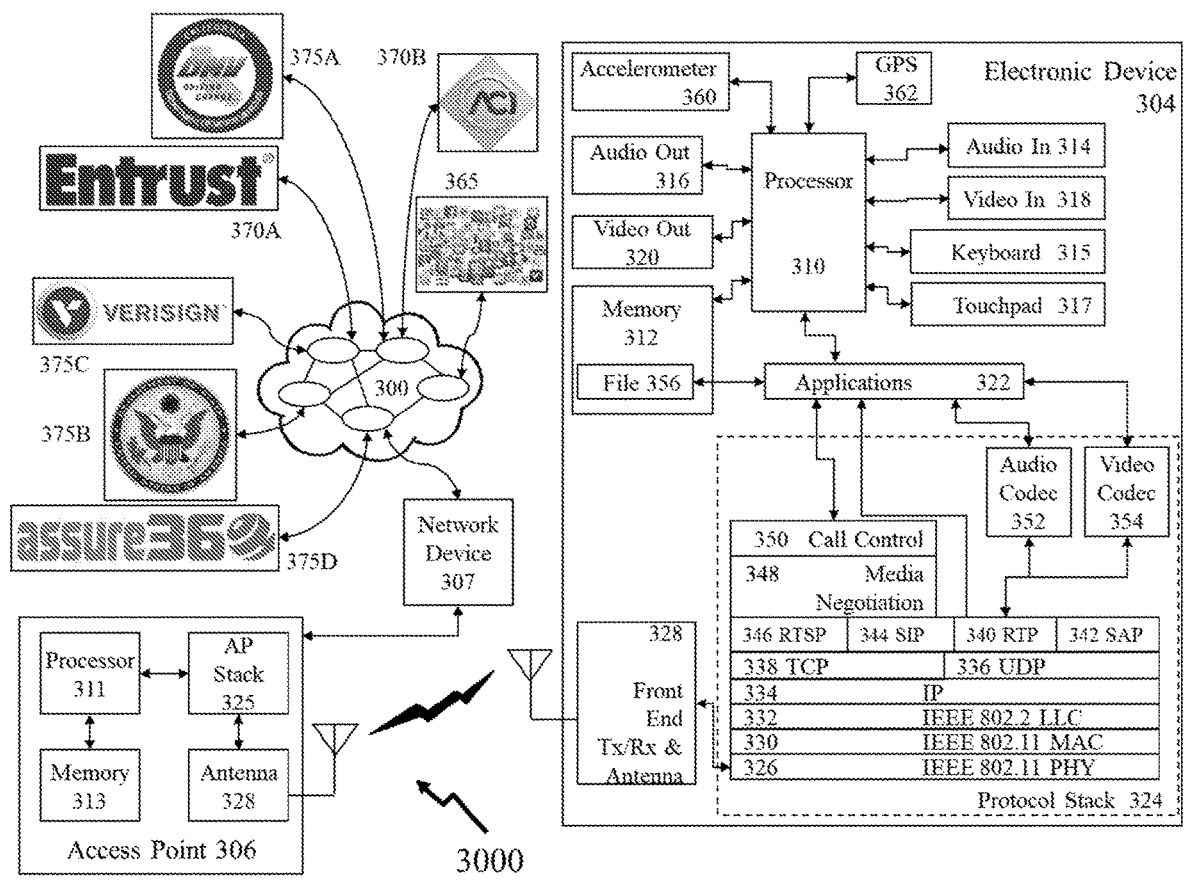
FIG. 3 depicts a wireless portable electronic device supporting communications to a network such as depicted in FIG. 4 and as supporting embodiments of the invention.

Referring to FIG. 3 there is depicted a card credential matching architecture at a store front relying party according to an embodiment of the invention as part of a RVWIE such as depicted in FIGS. 1 and 2 respectively. Accordingly, part of the RVWIE is depicted by PHYSAPs 155A to 155N respectively in respect of a user 165 and their card credential 160. Accordingly, the user 165 visits a store front relying party 370, such as described supra in respect of FIGS. 1 and 2 respectively by first and second store front relying parties 170A and 170B respectively. Depicted as part of a store front relying party 370 is a CARd CRedential chECker (CARCREC) system 310 comprising in addition to the terminal 315 modules including, but not limited to, those providing image pre-processing 320, optical character recognition (OCR) 330, feature extraction 340, and magnetic/electronic extraction 350 for example. Accordingly, the user presents their card credential 160 at the store front relying party 270 wherein an agent of the store front relying party 370 inserts the card credential 160 into the terminal 315 wherein the image pre-processing 320, optical character recognition (OCR) 330, feature extraction 340, and magnetic/electronic extraction 350 modules extract their information wherein this is communicated via network 300 to an appropriate one of the PHYSAPs 155A to 155N respectively via an Attribute Provider, not shown for clarity. For example, if the card credential 160 is a California driver's license then the PHYSAP may be part of the California Department of Motor Vehicles or alternatively if the card credential 160 is a US passport then the PHYSAP may be associated with the US Department of State.

The information derived from the card credential 160 by the CARCREC system 310 are communicated to a DVIVE 260 within PHYSAP 155 which extracts information from the Identity Attribute Database 250 in dependence upon elements of the extracted information to establish whether the user 265 is the legitimate owner of the card credential 160 or not. The resulting determination is then provided back to the CARCREC system 310 via the Attribute Provider, not shown for clarity, for display to the agent of the store front relying party 370.

Now referring to FIG. 3 there is depicted an electronic device 304 and network access point 307 supporting RVWIE features according to embodiments of the invention. Electronic device 304 may, for example, be a PED and/or FED and may include additional elements above and beyond those described and depicted. Also depicted within the electronic device 304 is the protocol architecture as part of a simplified functional diagram of a system 3000 that includes an electronic device 304, such as a smartphone 455 in FIG. 4, an access point (AP) 306, such as first AP 410 in FIG. 4, and one or more network devices 307, such as communication servers, streaming media servers, and routers for example such as first and second servers 490A and 490B respectively. Network devices 307 may be coupled to AP 306 via any combination of networks, wired, wireless and/or optical communication links such as discussed above in respect of FIG. 4 as well as directly as indicated. Network devices 307 are coupled to network 300 and therein Social Networks (SOCNETS) 365, first and second Attribute Providers 370A and 370B respectively, e.g. Entrust™ and ACI Worldwide™, first and second government photographic identity providers 375A and 375B respectively, e.g. California Department of Motor Vehicles and US Department of State, and first and second Authentication Services 375C and 375D respectively, e.g. Verisign™ and Assure 360™.

The electronic device 304 includes one or more processors 310 and a memory 312 coupled to processor(s) 310. AP 306 also includes one or more processors 311 and a memory 313 coupled to processor(s) 310. A non-exhaustive list of examples for any of processors 310 and 311 includes a central processing unit (CPU), a digital signal processor (DSP), a reduced instruction set computer (RISC), a complex instruction set computer (CISC) and the like. Furthermore, any of processors 310 and 311 may be part of application specific integrated circuits (ASICs) or may be a part of application specific standard products (ASSPs). A non-exhaustive list of examples for memories 312 and 313 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 304 may include an audio input element 314, for example a microphone, and an audio output element 316, for example, a speaker, coupled to any of processors 310. Electronic device 304 may include a video input element 318, for example, a video camera or camera, and a video output element 320, for example an LCD display, coupled to any of processors 310. Electronic device 304 also includes a keyboard 315 and touchpad 317 which may for example be a physical keyboard and touchpad allowing the user to enter content or select functions within one of more applications 322. Alternatively, the keyboard 315 and touchpad 317 may be predetermined regions of a touch sensitive element forming part of the display within the electronic device 304. The one or more applications 322 that are typically stored in memory 312 and are executable by any combination of processors 310. Electronic device 304 also includes accelerometer 360 providing three-dimensional motion input to the process 310 and GPS 362 which provides geographical location information to processor 310.

Electronic device 304 includes a protocol stack 324 and AP 306 includes a communication stack 325. Within system 3000 protocol stack 324 is shown as IEEE 802.11 protocol stack but alternatively may exploit other protocol stacks such as an Internet Engineering Task Force (IETF) multimedia protocol stack for example. Likewise, AP stack 325 exploits a protocol stack but is not expanded for clarity. Elements of protocol stack 324 and AP stack 325 may be implemented in any combination of software, firmware and/or hardware. Protocol stack 324 includes an IEEE 802.11-compatible PHY module 326 that is coupled to one or more Front-End Tx/Rx & Antenna 328, an IEEE 802.11-compatible MAC module 330 coupled to an IEEE 802.2-compatible LLC module 332. Protocol stack 324 includes a network layer IP module 334, a transport layer User Datagram Protocol (UDP) module 336 and a transport layer Transmission Control Protocol (TCP) module 338.

Protocol stack 324 also includes a session layer Real Time Transport Protocol (RTP) module 340, a Session Announcement Protocol (SAP) module 342, a Session Initiation Protocol (SIP) module 344 and a Real Time Streaming Protocol (RTSP) module 346. Protocol stack 324 includes a presentation layer media negotiation module 348, a call control module 350, one or more audio codecs 352 and one or more video codecs 354. Applications 322 may be able to create maintain and/or terminate communication sessions with any of devices 307 by way of AP 306. Typically, applications 322 may activate any of the SAP, SIP, RTSP, media negotiation and call control modules for that purpose. Typically, information may propagate from the SAP, SIP, RTSP, media negotiation and call control modules to PHY module 326 through TCP module 338, IP module 334, LLC module 332 and MAC module 330.

It would be apparent to one skilled in the art that elements of the electronic device 304 may also be implemented within the AP 306 including but not limited to one or more elements of the protocol stack 324, including for example an IEEE 802.11-compatible PHY module, an IEEE 802.11-compatible MAC module, and an IEEE 802.2-compatible LLC module 332. The AP 306 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 304 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

As described supra the user 165 may present their first or second PhysIDs 160A and 160D respectively at a storefront retailer/government office or kiosk/enterprise, depicted as first and second store front relying parties 170A and 170B respectively, to identify themselves in the presence of an agent of the store front relying party. In these instances the first and second store front relying parties 170A and 170B each exploit a Photo-ID checker, referred to within this specification as a Ping360 system/device, to capture information from the first or second PhysID 160A and 160D respectively, which is then employed as described supra in respect of FIGS. 1 and 2, to verify the identity of the user 165 presenting the first or second PhysID 160A and 160D respectively and/or verify that the first or second PhysID 160A and 160D respectively presented is itself valid. Alternatively, the user 165 may present their EleID 160B to first and second store front relying parties 170A and 170B respectively resulting in the process flow described and depicted in respect of FIGS. 6A and 6B respectively or the user 165 may present their EleID 160B to first and second mobile relying parties 180C and 180D respectively resulting in the process flow described and depicted in respect of FIGS. 5A and 5B respectively.

Figure 4:
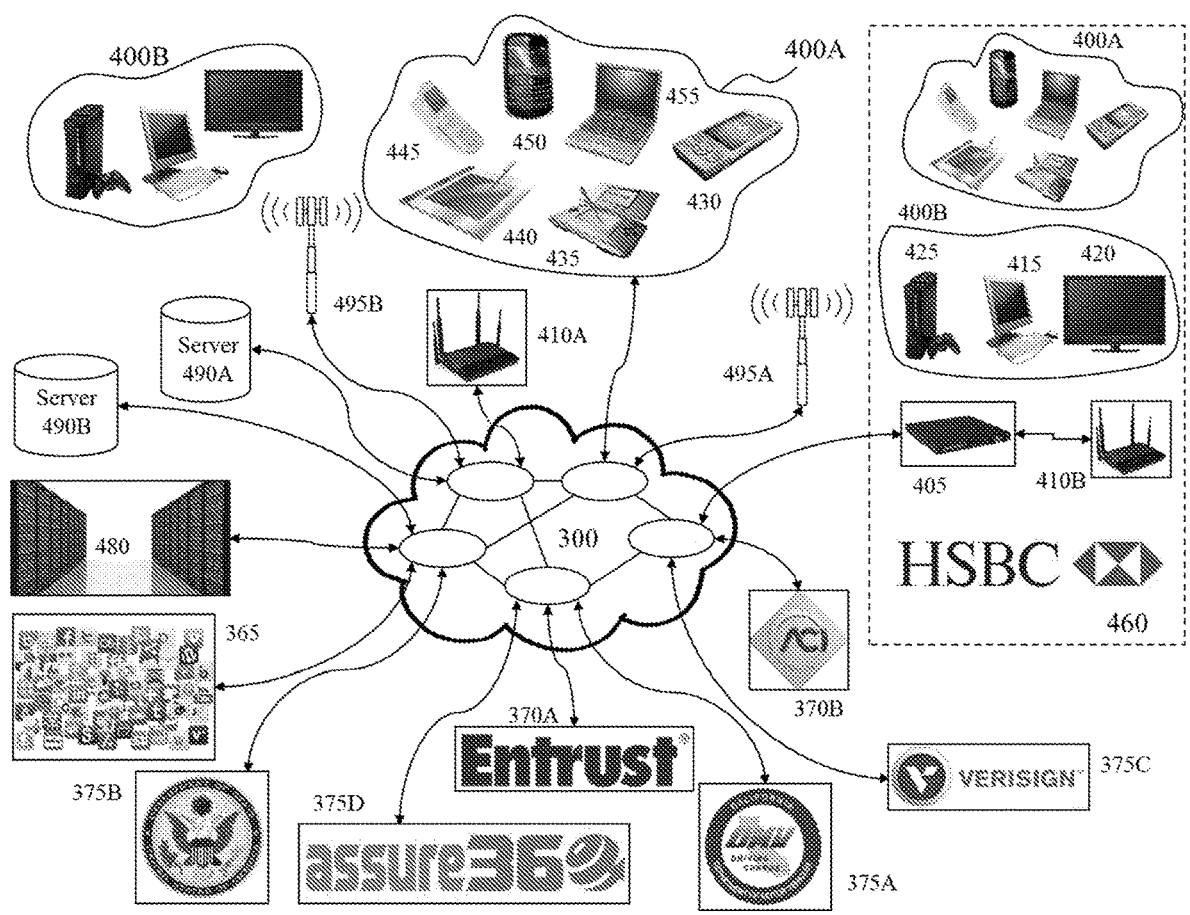
FIG. 4 depicts a network environment within which embodiments of the invention may be employed.

Now referring to FIG. 4 there is depicted a network within which embodiments of the invention may be employed supporting real world and virtual world identity ecosystems (RVWIEs) according to embodiments of the invention. Such RVWIEs, for example supporting activities such as the establishment of real world identity assurance, Level 3 assurance to physical store front relying enterprises, the binding of real world identity to electronic devices, and the provisioning of Level 3 identity verification to online retail relying enterprises. As shown first and second user groups 400A and 400B respectively interface to a telecommunications network 300. Within the representative telecommunication architecture, a remote central exchange 480 communicates with the remainder of a telecommunication service providers network via the network 300 which may include for example long-haul OC-48/OC-192 backbone elements, an OC-48 wide area network (WAN), a Passive Optical Network, and a Wireless Link. The central exchange 480 is connected via the network 300 to local, regional, and international exchanges (not shown for clarity) and therein through network 300 to first and second cellular APs 495A and 495B respectively which provide Wi-Fi cells for first and second user groups 400A and 400B respectively. Also connected to the network 300 are first and second Wi-Fi nodes 410A and 410B, the latter of which being coupled to network 300 via router 405. Second Wi-Fi node 410B is associated with Enterprise 460, e.g. HSBC™, within which other first and second user groups 400A are and 400B. Second user group 400B may also be connected to the network 300 via wired interfaces including, but not limited to, DSL, Dial-Up, DOCSIS, Ethernet, G.hn, ISDN, MoCA, PON, and Power line communication (PLC) which may or may not be routed through a router such as router 405.

Within the cell associated with first AP 410A the first group of users 400A may employ a variety of PEDs including for example, laptop computer 455, portable gaming console 435, tablet computer 440, smartphone 450, cellular telephone 445 as well as portable multimedia player 430. Within the cell associated with second AP 410B are the second group of users 400B which may employ a variety of FEDs including for example gaming console 425, personal computer 415 and wireless/Internet enabled television 420 as well as cable modem 405. First and second cellular APs 495A and 495B respectively provide, for example, cellular GSM (Global System for Mobile Communications) telephony services as well as 3G and 4G evolved services with enhanced data transport support. Second cellular AP 495B provides coverage in the exemplary embodiment to first and second user groups 400A and 400B. Alternatively the first and second user groups 400A and 400B may be geographically disparate and access the network 300 through multiple APs, not shown for clarity, distributed geographically by the network operator or operators. First cellular AP 495A as shown provides coverage to first user group 400A and environment 470, which comprises second user group 400B as well as first user group 400A. Accordingly, the first and second user groups 400A and 400B may according to their particular communications interfaces communicate to the network 300 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 400A may form associations either through standards such as IEEE 802.15 and Bluetooth as well in an ad-hoc manner.

Also connected to the network 300 are Social Networks (SOCNETS) 365, first and second Attribute Providers 370A and 370B respectively, e.g. Entrust™ and ACI Worldwide™ first and second government photographic identity providers 375A and 375B respectively, e.g. California Department of Motor Vehicles and US Department of State, and first and second Authentication Services 375C and 375D respectively, e.g. Verisign™ and Assure 360™, as well as first and second servers 490A and 490B which together with others, not shown for clarity. First and second servers 490A and 490B may host according to embodiments of the inventions multiple services associated with a provider of publishing systems and publishing applications/platforms (RVWIEs); a provider of a SOCNET or Social Media (SOME) exploiting RVWIE features; a provider of a SOCNET and/or SOME not exploiting RVWIE features; a provider of services to PEDS and/or FEDS; a provider of one or more aspects of wired and/or wireless communications; an Enterprise 460 exploiting RVWIE features; license databases; content databases; image databases; content libraries; customer databases; websites; and software applications for download to or access by FEDs and/or PEDs exploiting and/or hosting RVWIE features. First and second primary content servers 490A and 490B may also host for example other Internet services such as a search engine, financial services, third party applications and other Internet based services.

Accordingly, a user may exploit a PED and/or FED within an Enterprise 460, for example, and access one of the first or second servers 490A and 490B respectively to perform an operation such as accessing/downloading an application which provides RVWIE features according to embodiments of the invention; execute an application already installed providing RVWIE features; execute a web based application providing RVWIE features; or access content. Similarly, a user may undertake such actions or others exploiting embodiments of the invention exploiting a PED or FED within first and second user groups 400A and 400B respectively via one of first and second cellular APs 495A and 495B respectively and first Wi-Fi nodes 410A.

As noted supra first and second servers 490A and 490B together with others may host a variety of software systems and/or software applications supporting embodiments of the invention. However, embodiments of the invention may not only operate locally, regionally, or nationally but internationally and globally. Accordingly, some servers may manage and control operations in execution upon other servers. For example, an Authentication Service such as Authentication Service 190 in FIG. 1 (e.g. Assure360) may operate a server or servers within one or more jurisdictions which authenticate, using one or more machine authentications techniques servers, within that jurisdiction as well as other jurisdictions. Each jurisdiction server may be operated by the same Authentication Service as manages the supervisory servers or it may be operated by one or more Identity Authority Servers authorised by the Authentication Service managing the supervisory servers. Optionally, such providers of Authentication Services may be regulated by government regulatory bodies within their respective jurisdictions.

As noted supra as the verification processes are performed on firewalled servers associated with the physical attribute provider (PHYSAPs) then data relating to true original government issued photographic identity documents is maintained secure and private whilst the only information transmitted from a store front relying party is the extracted data for the presented government issued photographic identity document and that transmitted from a PHYSAP is the result of the verification/validation process. Similarly, data transmitted from an Attribute Provider is restricted, e.g. only the Identity Verification Score (IdVS) provided from the Attribute Provider server, e.g. Ping360 server, to the card reader at the store front relying party, e.g. Store Front Relying Party (TL1) 170A.

Accordingly, where government issued photographic identity cards are standardized, e.g. driver' licenses in all member states of the European Community, then the processes relating to the store front relying parties may be similarly tracked and employed across multiple jurisdictions. Alternatively, the user may transact business within another jurisdiction based upon the validation and verification of their identity. In such instances where a jurisdiction server (e.g. a country server) is transacting on behalf of a user (e.g. doing business or presenting their government issued photographic identity card) in another jurisdiction (e.g. country) then the two jurisdiction servers will first identify themselves before the user's digital identity will be assured by the jurisdiction server in the jurisdiction they live. Due to different provincial, state, territorial, differences such jurisdictions may include different states, regions, territories, etc., for example.

It would be evident that authentication may be conducted by an online relying party in the country in which the user is conducting business or by the user's Identity Provider (if the user uses one), if the online relying party the user is transacting with is networked with the user's Identity Provider. It would be evident that some enterprises and/or organizations acting as online relying parties, e.g. Google, American Express, HSBC and Facebook, may act as global identity providers whereas other online relying parties, e.g. Verizon and Chase Manhattan, may be only US identity providers.

Within the embodiments of the invention where an activity is defined with respect to a Store Front Relying Party 170A/170B or Online Relying Party 180A/180B then similar information and/or processes may be implemented with respect to a Mobile Relying Party 180C/180D in that they may be provided within verification information such as IdVS etc. Similarly, presentation of their online electronic credential/electronic identity document may be, as described below in respect of FIGS. 6 and 7, employed without transfer to the mobile relying party 180C/180D but in other embodiments of the invention the mobile relying party 180C/180D may capture an image of the electronic credential/electronic identity document.

Accordingly, within an embodiment of the invention a license holder may perform the following sequence of actions:
- The license holder logs in to an Identity Authority Server using a PHYSAP (e.g. a RetroTrust™ software application) on their PED and multi-factor-authentication (MFA)
- The license holder requests a download of their driver's license, vehicle registration, and proof of insurance document onto the license holder's PED and also enters the police officer's badge number and department onto the PHYSAP so that the documents also download onto the PED of the police officer who is requesting to see the documents.
- The documents download simultaneously from the Identity Authority Server onto the PEDs of the license holder and the police officer.
- At the same time the EIdApp displays on both PEDs the same fractal, which was also downloaded along with the documents from the Identity Authority Server.
- The two fractals which are easy to compare ensures that the officer is confident that the downloaded documents on both devices are exactly the same.

Figure 5A:
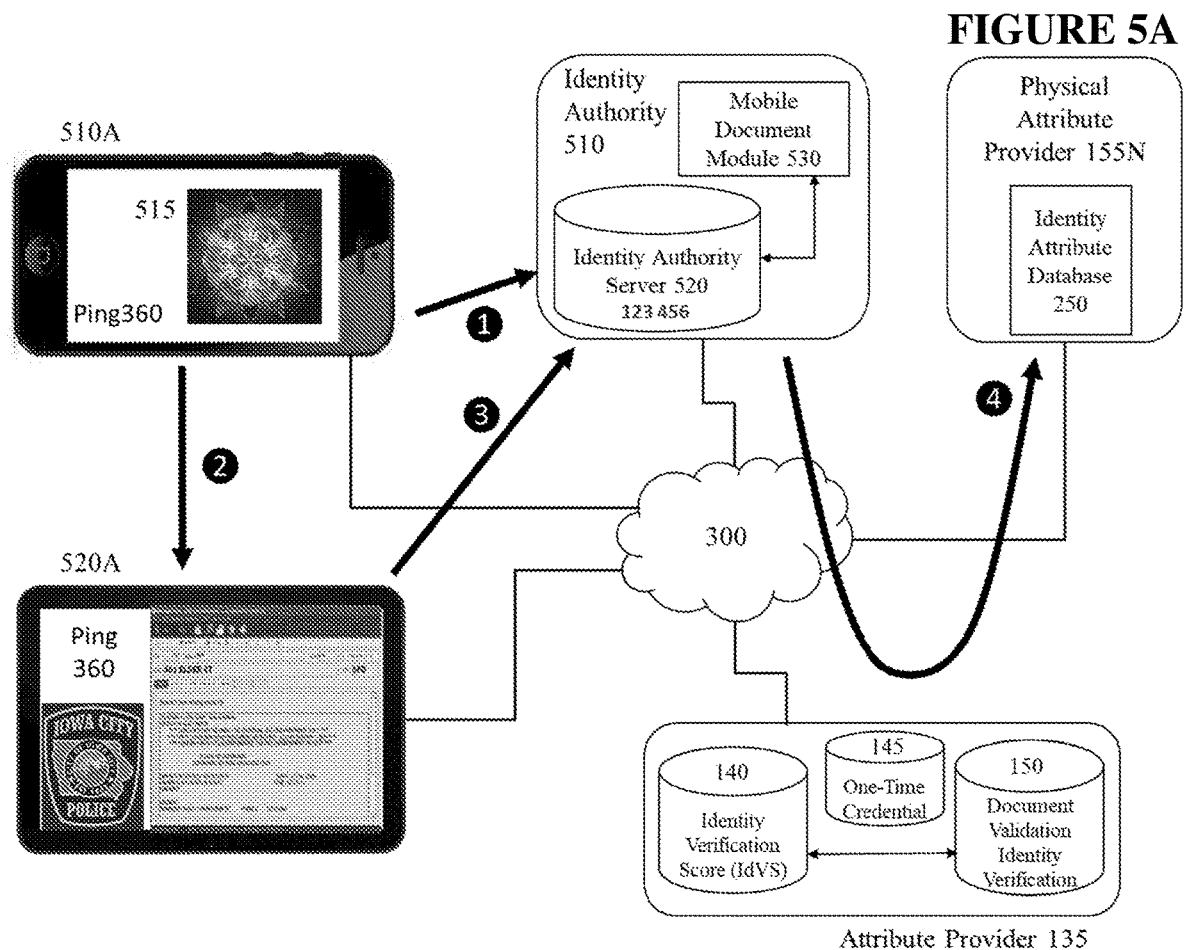
FIGS. 5A and 5B depict an exemplary process flow for establishing verification of a credential provided by a user within an environment according to an embodiment of the invention.
Figure 5B:
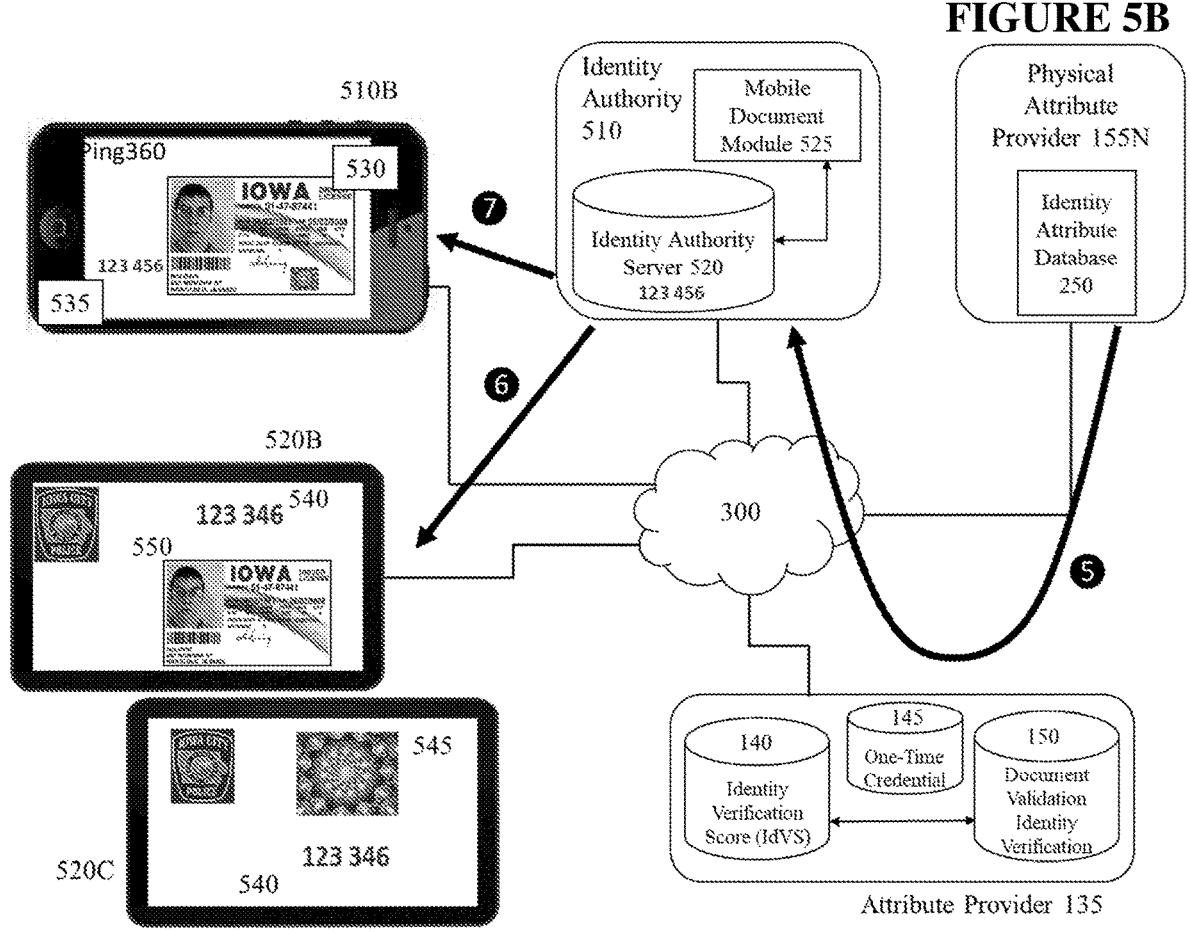

Now referring to FIGS. 5A and 5B there is depicted an exemplary process flow for establishing verification of a credential provided by a user within an environment according to an embodiment of the invention. In this instance, rather than a retail environment, the user is presenting their EleID in an external, i.e. mobile environment, such as, for example, presenting their electronic driving license to a police officer during a traffic stop, for example. Accordingly, the user having been asked to provide their driving license has elected to present their EleID and activates the EleIDAp. The user may have only an EleID or in other instances they may be issued with an EleID and a PhysID when they verify themselves and obtain the credentials such as described above in respect of FIGS. 1 and 2. According, the user triggers through their interaction with the EleIDAp a first message "1" to the Identity Authority (IA) 510 which houses at least an Identity Authority Server (IAS) 520 and Mobile Document Module (MDM) 525.

At the same time the EleIDAp displays a fractal 515 upon its display as depicted with first EleIDAp display 510A. This fractal 515 is then acquired by an official electronic device (OED) displayed in first OED configuration 520A. As displayed the OED is associated with the Iowa City Police Department. The fractal 515 may be acquired through the user's PED being held such that an image of the display may be captured by a camera within the OED. Alternatively, the OED and user's PED may pair through a local area network interface, e.g. Bluetooth or another interface such as Near Field Communications (NFC).

Optionally, the fractal 515 may be a fractal obtained from IA 510 in response to the first message "1." Optionally, the fractal 515 may include encrypted data. Optionally, the fractal 515 as displayed is pulsating and data relating to the pulse sequence of the fractal images presented acquired by the OED. The OED may be executing a EleIDAp such as "Ping 360" in addition to specific software associated with the OED or the EleIDAp is an application embedded within the OED software. In either instance the OED generates a third message "3" which is transmitted to the IA 510. This may be the fractal 515 together with information associated with the OED or information extracted, i.e. decrypted, from the fractal 515 or acquired as part of the communications between OED and PED. Within an embodiment of the invention this information may include a one-time identification number embedded within the fractal 515, or a hash value of the one-time identification number. This one-time identification number and/or the fractal 515 may have been communicated by the IA 510 to the user's PED in response to the first message "1." Optionally, there may be a time limit associated with the timing of receipt of messages "1" and "3" by the IA 510.

Accordingly, the IA Server based upon the information extracted from the fractal 515 and/or information received with the message "3" establishes, through request "4" to Attribute Provider 135 and PhysAp 155N, personal information. This personal information is provided back to the IA 510 by Attribute Provider 135 and PhysAp 155N as first response "5". This response "5" may include appropriate identity attribute information relating to the PhysID and/or EleID as well as a representation of the PhysID and/or EleID.

Accordingly, the IA 510 generates second and third responses to the OED and PED respectively. In second response "6" the OED receives, based upon the appropriate privacy requirements of the user based upon identity information of the organization associated with the OED, appropriate information including a privacy compliant representation 550 of the PhysID and/or EleID, and a first unique identifier 540 provided from the IA Server 520 within the IA 510. As such the OED may display to the officer associated with the OED, as indicated by OED in second OED configuration 520B, wherein the privacy compliant representation 550 and unique identifier 540 are displayed. The officer associated with the OED can then compare these to the PhysID and/or EleID being offered by the user. In the instance of an EleID the third response "7" to the user's PED may trigger the EleIDAp in execution upon their PED, e.g. Ping 360 application, to display as displayed in second EleIDAp configuration 510B, the EleID 530 together with a second unique identifier 535 provided to them within third response "7." As such the EleIDAp in execution upon the user's PED provides information against which the officer with the information upon their OED can compare. As such the officer would be seeking to verify that the EleIDs match and the unique identifiers match. Optionally, as indicated within third OED configuration 520C the IA 510 may have communicated a second fractal 545 to the OED within second response "6." This second fractal 545 may for example be a fractal associated with the PhysID and/or EleID and bound to it at issuance (optionally this is also part of the PhysID and/or EleID. Optionally, the fractal, representation of PhysID and/or EleID, and unique identifier may be provided upon the OED.

Optionally, the EleID and/or a representation of the PhysID may be modified, i.e. redacted, in order to meet the appropriate privacy requirements which may be determined in dependence upon several factors including, but not limited to, the age of the user, the requesting third party, the jurisdiction of issuance of the EleID/PhysID, the jurisdiction of the third party requesting verification, and an activity associated with the verification process.

Figure 6:
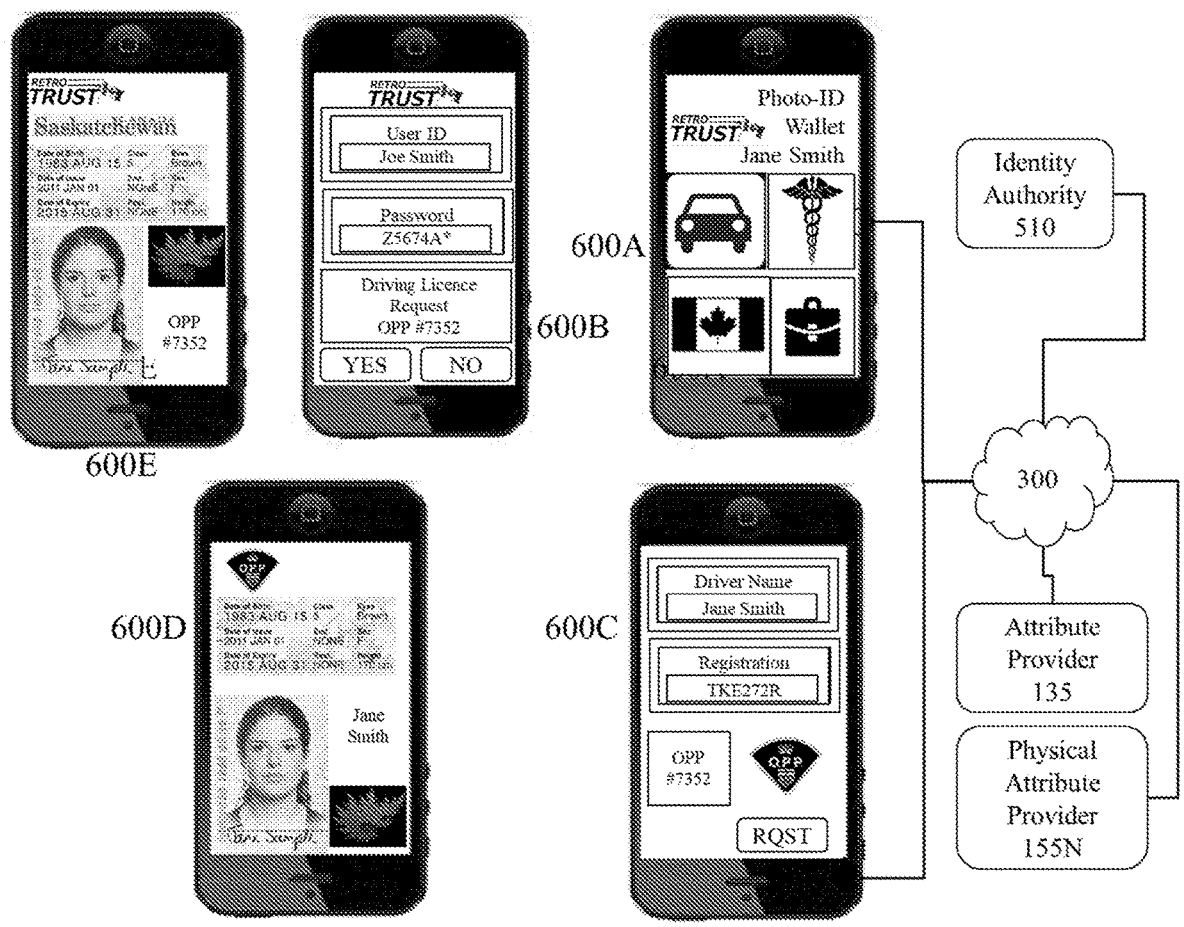
FIG. 6 depicts an exemplary network environment for user authentication of an identity application according to an embodiment of the invention.

Referring to FIG. 6 there is depicted an exemplary network environment for user authentication of a photographic identity (PhotoID) according to an embodiment of the invention wherein a user has a photographic identity application in execution upon a PED as depicted in first image 600A which is in communication via network 300 with IA 510, PHYSAP 155N, and AP 135. Subsequently, for example in respect of an encounter with law enforcement, they receive a request upon their PED in respect to verifying their PhotoID. The request having been issued by the law enforcement officer, in this example "OCP #7352", based upon a request issued from a PED as depicted in third image 600C associated with the law enforcement officer which is routed to PHYSAP 155N and therein triggers provisioning of the request to the user's PED. The triggering request depicted in second image 600B wherein the user enters their user identity and password in respect of the request which is then communicated to the PHYSAPP 155N wherein the user's and officer's PEDs receive data relating to the user's driving license as depicted in fourth and fifth images 600D and 600E respectively. Accordingly, the officer's PED displays content derived from the user's driver license together with a fractal image which they can then use to verify the fractal image upon the user's PED etc. It would be evident that the user may login to their identity wallet (PhotoID wallet) using multi-factor authentication (MFA) such as user name, password and biometric signature.

Within embodiments of the invention a user may be asked for permission to exploit an immutable digital ledger through a "Smart Contract." For example, this may occur when a user is in a storefront location and as the card holder tries to verify their card for the first time or the first instance after some other verification, authentication, trust level, etc. has been exceeded. A simple smart contract is then presented that seeks the card holder's permission to confirm their identity attributes found on the card holder's PhotoID against the card holder's identity attributes stored in the PhotoID issuer's database. The card holder is also asked for an electronic address, e.g. email, and then must press an "Agree and Submit" button to grant permission. Subsequently, or in combination with this, the user provides a second permission that gives the Company managing the processes the right to accumulate the card holder's identity verification scores. Similarly, a third permission may be required, which will typically be at a later date, will seek the card holder's permission to link specific card holder's identity attributes (e.g., face, address, date of birth, email address etc.) to the card holder's financial instruments. Such a "smart contract" once completed may then be provided to the user's electronic address together with links to additional terms and conditions etc. if appropriate. The user would be also able through such links to rescind their permission within a period of time consistent with the local Government regulations applicable with respect to the PhotoID and/or user's residential address. It would be evident that other "Smart Contracts" may be provided at this point in time, or periodically for re-validation or re-verifying consent, or upon specific triggers and/or trigger events.

Accordingly, the user in providing this "explicit informed consent" allows the systems according to embodiments of the invention to provide, via tokenization and/or encryption, linkage of a user's identity attributes, i.e. as confirmed by a Government issued photographic identity database, e.g. their driver's license, to the individual's financial instruments, e.g. payment cards, debit cards, credit cards, etc., and accordingly their financial accounts. Accordingly, the PED and/or FED at a retail outlet employed as part of the presentation/acceptance of the "Smart Contract(s)" may also provide linkage between the individual's confirmed identity attributes and their financial cards and/or financial accounts. This may happen as a subsequent event or immediately wherein with customer and retailer consents the systems according to embodiments of the invention may combine the attribute search permission(s) with the attribute(s) and therein financial card and account linkage permission(s) from the user. The record of the linkage between the confirmed identity attributes and the financial cards and accounts may then be kept on an immutable digital ledger.

Figure 7:
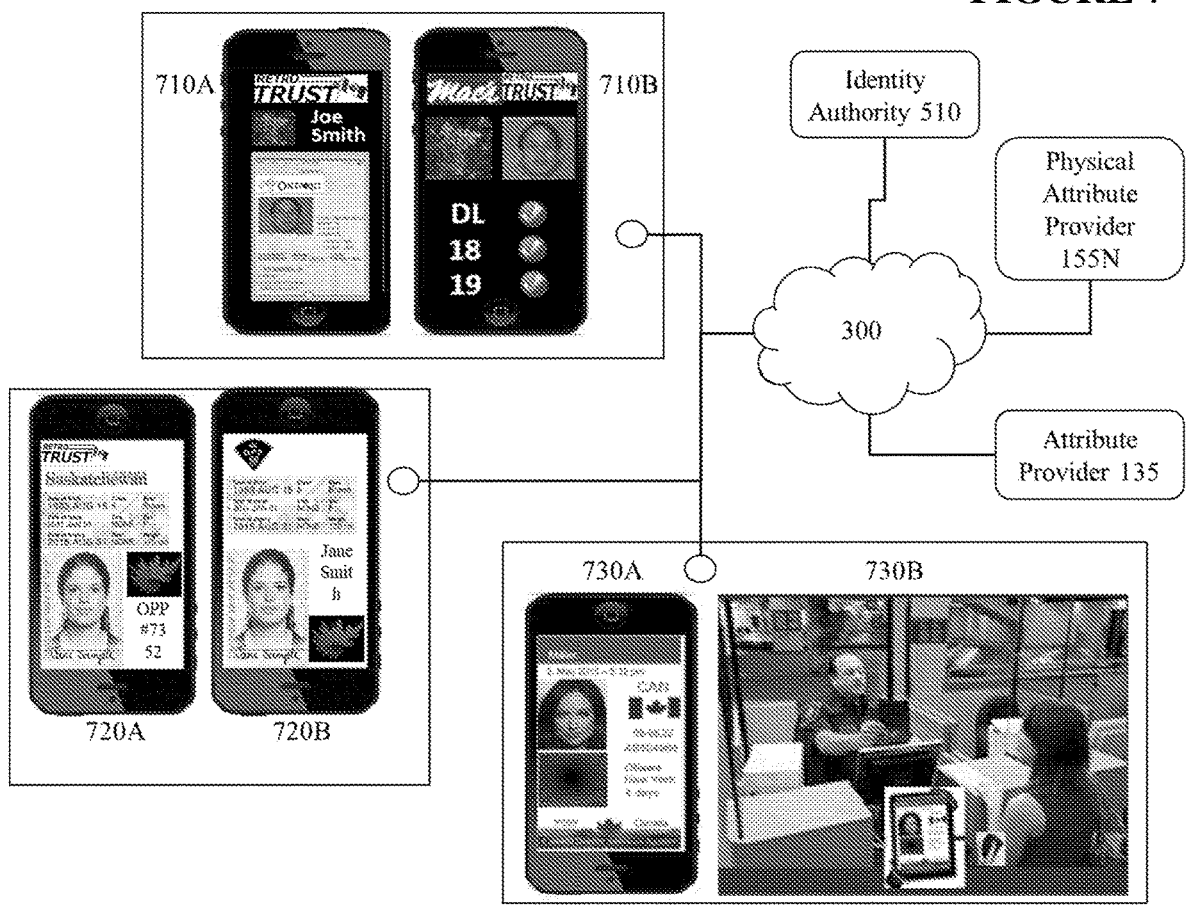
FIG. 7 depicts exemplary use cases for identity verification exploiting an identity application according to an embodiment of the invention.
Figure 8:
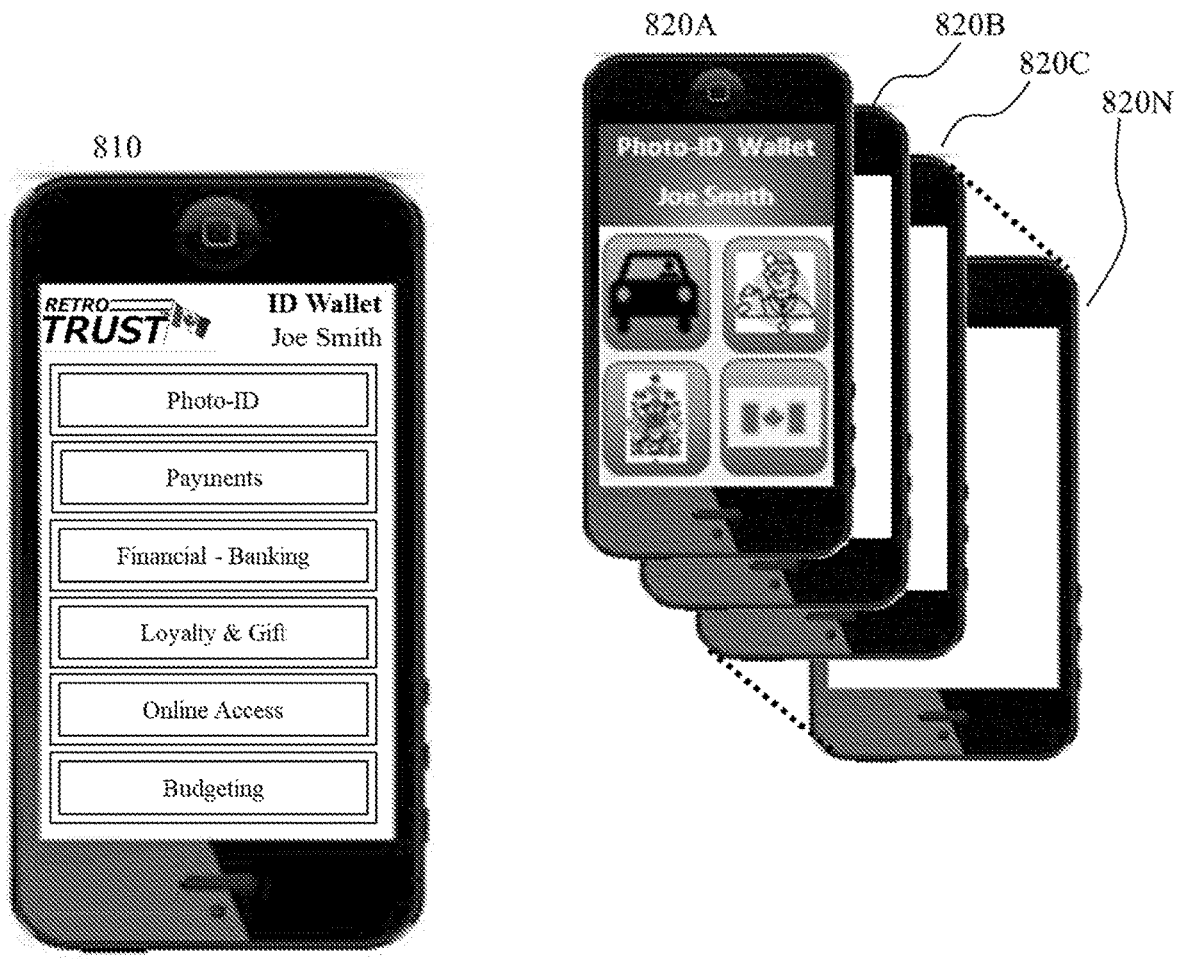
FIG. 8 depicts the integration of the identity verification/application within an electronic identity wallet according to an embodiment of the invention.

Accordingly, as depicted in FIG. 7 depicts exemplary use cases for identity verification exploiting an identity application according to an embodiment of the invention such as depicted in first and second images 710A and 710B respectively wherein the user is verified within a retail environment, e.g. a convenience store, such that the retailer verification on second image 710B is the user's image for recognition, fractal for comparison to user's PED fractal, and verified indicators for the user's driving license being valid and the user's age with respect to Government regulated ages, e.g. for alcohol, tobacco products, adult magazines, etc. Third and fourth images 720A and 720B relating to the user's driving license whilst fifth and sixth images 730A and 730B relate to the user's passport wherein the details are provided to the border services agent's PED or FED. Accordingly, as depicted in FIG. 8 the PhotoID concepts can be extended into an identity wallet (ID Wallet) for a user as depicted in first image 810 wherein the ID Wallet application allows the user to access Photo-ID, Payments, Financial—Banking, Loyalty & Gift, Online Access, and Budgeting functions. Accordingly, selection of one of the categories triggers the presentation of a user screen such as depicted with user screens 820A to 820N wherein the functionality may be varied according to the different categories and as evident from discussions below prior art techniques such as chip-and-pin verification for financial instruments such as credit cards may be combined with Identity Attribute Assurance, Identity Verification Scores, photographic identity etc. This being facilitated, for example, by cross-access of PHYSAPs such that, for example, payment with a credit card to a financial processing, e.g. MasterCard, may link through to the financial institution, e.g. TD Bank, which provides a request to a Government photographic identity provider, e.g. driving license, resulting in the photograph of the user being communicated back to the terminal of the retailer such that they can verify the user of the card thereby reducing credit card fraud. Alternatively, the financial institution may acquire images of their account holders based upon a verification of the account holder through their Government issued photographic identity and this is provided back via the financial processing to the retailer.

Accordingly, embodiments of the invention may be integrated to third party payment solutions using one or more authentications as known within the prior art. Such transactions and their associated verifications may be employed as established by the inventors in relation to the Identity Verification Score described supra.

Within embodiments of the invention the immutable digital ledger such as a blockchain may simply store a trust level of the storefront location, for example, without any information on where the transaction took place, the transaction value, the transaction details, etc. In other embodiments of the invention some information may be associated such as a location identifier for example.

Figure 9A:
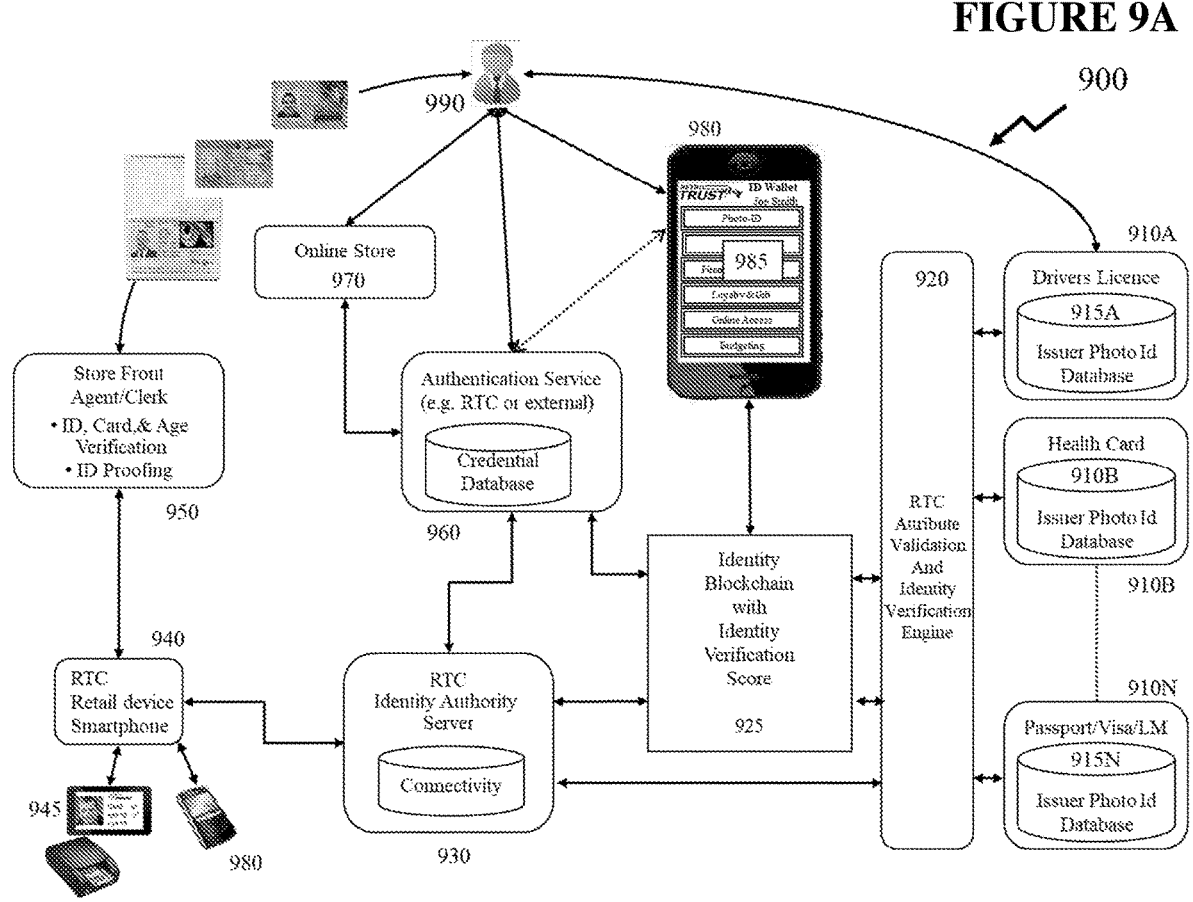
FIG. 9A depicts integration of blockchain verification/authentication to an identity verification/application within an electronic identity wallet according to an embodiment of the invention.

Now referring to FIG. 9A there is depicted a network schematic/process flow 900 s integration of blockchain verification/authentication to an identity verification/application within an electronic identity wallet according to an embodiment of the invention. As depicted a plurality of PHYSAPs 910A to 910N relating to Government issued photographic identities, for example driver's license, health card, passport, etc. wherein each PHYSAP 910A to 910N includes a database, depicted as plurality of databases 915A to 915N respectively. These link, via a network (not shown for clarity) to a RetroTrust Corporation (RTC) Attribute Validation and Identity Verification Engine (RTC-AVIVE) 920 which provides interfaces to an RTC Identity Authority Server (RTC-IAS) 930 (e.g. Attribute Provider 135 supra in FIG. 1) and an Identity Blockchain with Identity Verification Score engine (IB-IVSE) 925. The IB-IVSE 925 also links to the RTC-IAS 930, the PED ID Wallet application (ID-WAP) 985 upon PED 980, and an Authentication Service 960 (e.g. Authentication Service 190 supra in FIG. 1).

Accordingly, if the user 990 makes a purchase from an online store 970 through the ID-WAP 985 data passes from the user and their ID-WAP 985 on their PED 980 to/from the Authentication Service 960 and therein to/from the IB-IVSE 925 and RTC-IAS 930 and therein RTC-AVIVE 920 and PHYSAPs 910A to 910N. In this manner the user's credential is verified such as described in respect of embodiments of the invention and their Identity Verification Score updated. The ID-WAP 985 communicates with the IB-IVSE 925 which establishes and maintains one or more blockchains associated with the user such that these maintain a continuously growing list of transactional data records of the transactions performed by the user which are hardened against tampering and revision. In this manner each blockchain associated with the user maintains a ledger of transactions which may be enforced cryptographically.

Similarly, the user may make a purchase at a retail location 950 employing an RTC retail device 945 and/or PED 980 as described supra in respect of FIGS. 1 and 2. In this manner data is communicated to the RTC-IAS 930 and therein the IB-IVSE 925 and RTC-IAS 930 and therein RTC-AVIVE 920 and PHYSAPs 910A to 910N. In this manner the user's credential is verified such as described in respect of embodiments of the invention and their Identity Verification Score updated. The ID-WAP 985 communicates with the IB-IVSE 925 which establishes and maintains one or more blockchains associated with the user such that these maintain a continuously growing list of transactional data records of the transactions performed by the user which are hardened against tampering and revision. In this manner each blockchain associated with the user maintains a ledger of transactions which may be enforced cryptographically.

Within the blockchain(s) the transaction(s) are time-stamped allowing them to be employed as a trusted timestamp for arbitrary messages as well as transaction information. In some embodiments of the invention third party application services may access content stored directly in the blockchain, where the blockchain is accessible. In other embodiments of the invention partial content may be accessed externally but content may be encrypted securely.

It would be evident that a blockchain according to an embodiment of the invention may store transaction data together with timestamp information as well as the Identity Verification Score (IVS). It would be evident that the blockchain may contain one or more hash values within the blockchain discretely or in association with transactions. In other instances, the blockchain may embed additional information including smart contracts, for example.

The Identity Verification Score (IVS) will be kept on a Blockchain in the tablets (945) located at storefront retailers: convenience stores, financial institutions, auto-rentals, auto-dealers, department stores, etc., AND the IVS on the Blockchain could also be kept on a server (925), FIG. 9A.

Figure 9B:
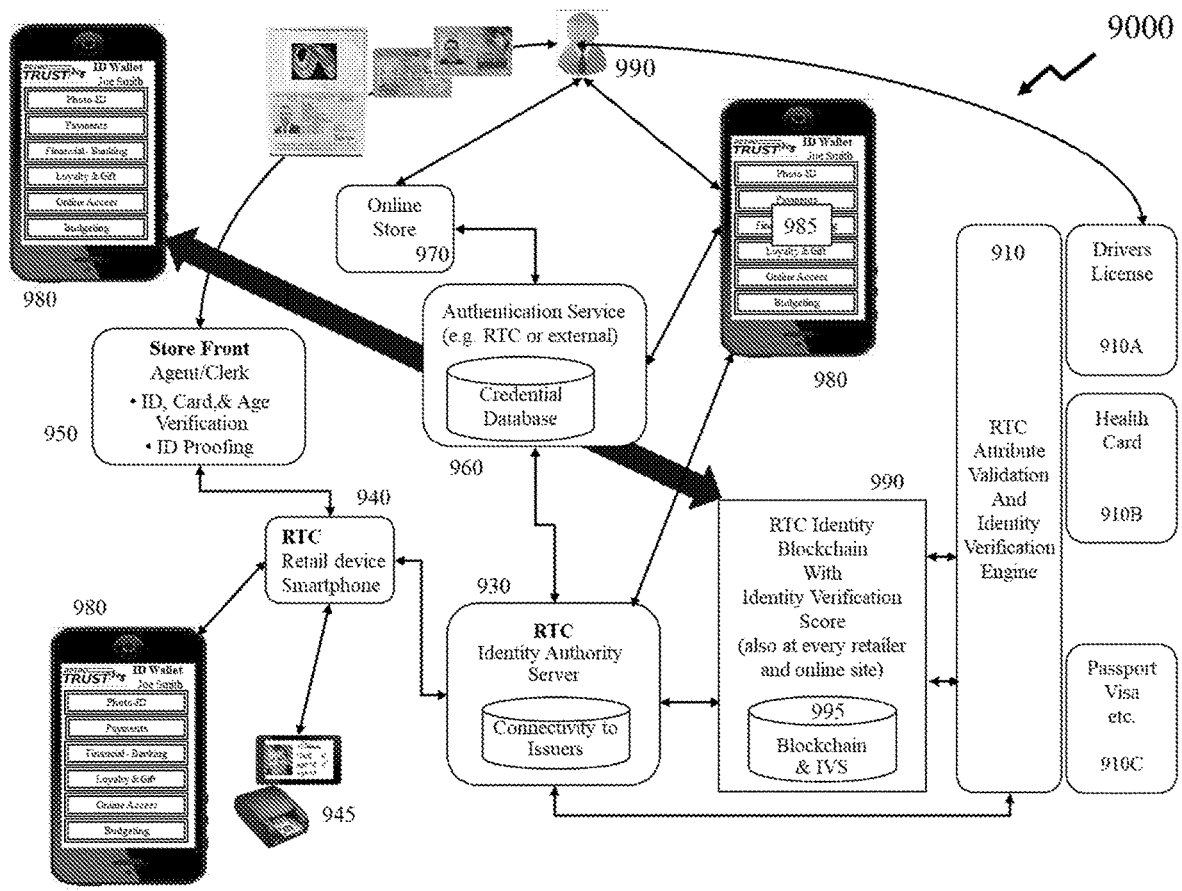
FIG. 9B depicts integration of blockchain verification/authentication to an identity verification/application within an electronic identity wallet according to an embodiment of the invention.

Referring to FIG. 9B there is depicted an alternate network schematic/process flow 9000 with respect to the integration of blockchain verification/authentication to an identity verification/application within an electronic identity wallet according to an embodiment of the invention. In structure network schematic/process flow 9000 is essentially identical to network schematic/process flow 900 in FIG. 9A except the IB-IVSE 925 is now replaced by an RTC IB-IVSE 990 with an associated Blockchain & IVS database 995. Accordingly, the RTC IB-IVSE 990 establishes communication with the ID-WAP 985 on the user's PED 980. However, unlike IB-IVSE 925 the RTC IB-IVSE 990 is distributed, such as for example, each online retailer server or retail store server such that the blockchains are distributed and accessible to these systems. Accordingly, these blockchain(s) may be extended based upon the transaction(s) performed by the user and may be used as "local" verification for the transaction through their storage of one or more hash values. Within embodiments of the invention the immutable digital ledger may also be stored on each PED or terminal 945 located at the storefront retailers.

Within other embodiments of the invention content stored within the immutable digital ledgers may be encrypted wherein the content is decrypted with a key transmitted to the recipient's PED and/or FED in instances such as border services, law enforcement etc. Optionally, an immutable digital ledger may provide data relating to a user's original identity document.

Optionally, local verification of the user may be performed based upon comparing one or more hash values stored within an immutable digital ledger with a value provided from the user's PED and é or FED wherein the hash value relates to, for example, transaction data, timestamp data and a pseudorandom value added by the user's PED such that the hash value cannot be derived from the transaction data nor the transaction data derived from the hash value. In this manner data within the hash value can only be extracted from the user's PED through their identity wallet such that a user may be locally verified to a system based upon the user's PED extracting data relating to one or more transactions for verification to the system based upon data provided to it. Accordingly, a user's transactional history can be employed to provide local verification wherein the local verified hash/blockchain are periodically re-verified at a higher level through another transaction relating to the user and a third party accessing data relating to an originally issued identity document. Optionally, local verification may be performed on low value transactions to avoid repeated requests for data relating to the originally issued identity documents of the user being made.

Within the embodiments of the invention described above an application and/or applications are described as being in operation upon the user's PED, retailer POS terminals, and mobile OEDs etc. Within other embodiments of the invention these may be replaced with the use of mobile web application(s) such that nothing is physically loaded upon the PED, retailer POS terminal, mobile OED, etc. except as necessary to execute the web based application and/or display the required information on the associated displays with these electronic devices and/or systems.

Within an immutable digital ledger such as a blockchain, other options include, for example, linking a user's health/medical card with their driver's license for future validations. Such linking being compliant to the appropriate privacy laws etc.

Within embodiments of the invention the user's PED may provide to another electronic device and/or system a unique identifier, e.g. text, image, fractal, encrypted content, etc., which triggers and/or permits the downloading of an electronic representation of the PhysID and/or EleID. Optionally, the user's PED may download this electronic representation of the PhysID and/or EleID to the user's PED based upon a requester (hereinafter Requester), e.g. police officer, entering a code into the EleIDAp in execution upon or accessed as a web application. This electronic representation of the PhysID and/or EleID being concurrently downloaded to the Requester's electronic device, e.g. OED, allowing them to verify the identity of the user. Within embodiments of the invention the entry of the Requester's code may be based upon entry of a code generated at that point in time such as employed in the prior art in generating security key information for online security applications etc. This code may be triggered by an action of the Requester with respect to their own PED, a wearable device, etc. Optionally, a wearable device may be continually generating such codes and the association of the user's PED with the wearable device results in the capture of the code and its use. Such techniques, as well as others known in the art, would prevent theft of a code associated with a police officer, for example, by use by a third party.

Optionally, a user may request a download of their PhyID and/or EleID from the IA 510 wherein they are provided to their PED a unique image and a PIN number. The Requester is given the 6-digit PIN number by the mobile device holder, i.e. the user. The Requester, who is an accredited user of an application authorised to access the IA 510, provides this PIN number, within a specified time frame, on a request page and the user's EleID and/or PhysID representation is downloaded onto the Requester's FED and/or PED along with the unique image. Optionally, according to embodiments of the invention this data is retrieved from an immutable digital ledger such as a blockchain.

Within the embodiments of the invention presented supra the EleID and PhysID have been described with respect to verification/authentication back to a TL1 issuing authority, e.g. Government department such as associated with passports, driving licenses, etc. However, in other embodiments of the invention binding of identities to a user may be performed at a lower trust level but are not, generally, associated with the issuance of a EleID/PhysID relating to a TL1 type issuing authority although this may not be excluded. Consider, for example a user seeking to access medical services, which are a common source of identity fraud. In this instance, the user may present their medical card which identifies them as having a certain level of medical healthcare insurance, e.g. BlueCross, Medicare, Medicaid etc. In doing so this medical card may be scanned, e.g. using a Ping360, and data/imagery captured from it. The user may be required at the same time, in order to provide additional identity verification, be required to provide their driver's license and/or passport which would also be scanned, again for example, using the Ping360, and then have their photograph taken. Accordingly, these additional documents can be verified based upon embodiments of the invention such as described above to their issuing authority or an intermediate verification authority. In the event that one or more of these credentials does not match the medical card then, in most instances, a fraud is being attempted and can be stopped prior to provisioning of medical services, prescription, etc. At the same time as the user's photograph is taken then even where all documents have been tampered with then their identity is captured.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method of permitting an individual to access a registered account with an online service controlled by a third party by providing to the third party unique information that verifies the identity of the individual and the right to access the registered account, the method comprising:

providing to a first electronic device a first credential information relating to the individual associated with the first electronic device; the first credential information authorizing submission of a first message to a first remote server or a cluster of servers;

transmitting a first data from the first electronic device to a first remote server or a cluster of servers, the first data comprising the specification of the online service which the individual desires to access, aspects of the individual's identity information, and permission to transmit the aspects of the individual's identity information to a second remote server or a cluster of servers associated with the third party;

transmitting a second data from the first electronic device to both the first remote server or a cluster of servers and the second remote server or a cluster of servers associated with the third party, the second data consisting of an account identifier associated with an account of the individual with the online service, and a unique cryptographically generated value for one-time use to access the online service;

transmitting a third data from the first electronic device to the first remote server or a cluster of servers, the third data consisting of additional credential information needed to complete independent verification of the aspects of the individual's identity information associated with the individual by the first remote server or a cluster of servers;

the first remote server or a cluster of servers cryptographically combining contents within the second data with the additional credential information in the third data, and using the resulting combination to locate a matching verification entry in a database;

after locating such a match, transmitting a fourth data by the first remote server or a cluster of servers to the second remote server or a cluster of servers, the fourth data consisting of the aspects of the individual's identity information, evidence of independent verification of the aspects of the individual's identity information, and the unique cryptographically generated value transmitted in second data; and after verifying that the aspects of the individual's identity information received in fourth data is consistent with that of an online account controlled by the third party, and that the unique cryptographically generated value received in fourth data matches the unique cryptographically generated value received from the first electronic device in the second data, the second remote server or a cluster of servers grant access to the account of the individual using the first electronic device.

2. The method according to claim 1 wherein the aspects of the individual's identity information transmitted in either the first data, the fourth data, or both represent at least one of:

an image of an identity document originally issued by the third party or a government authority;

a digital representation of an identity document originally issued by the third party or a government authority;

a privacy policy compliant redacted image of an identity document originally issued by the third party or a government authority;

a privacy policy compliant redacted digital representation of an identity document originally issued by the third party or a government authority; and a predetermined portion of identity data stored by the third party or government issuer of an identity document.

3. The method according to claim 2 wherein:

the verification entries stored in the database consist of at least one of:

information stored by the third party or issuer of identity document(s) referred to in claim 2;

cryptographically secured representations of identity information verified by the third party and/or an issuer of an identity document referred to in claim 2;

cryptographically secured representations of identity information verified by another authority.

4. The method according to claim 1 wherein the unique cryptographically generated value transmitted in second data is at least one of:

a randomly generated string of characters and/or digits of specified minimum length;

a first unused entry from a unique sequence of strings of characters and/or digits from an electronically generated list of such strings that was delivered to both the first electronic device and the second remote server or a cluster of servers by the first remote server or a cluster of servers at the time the individual registered for the ability to use this access method; or a first unused entry from a unique sequence of strings of characters and/or digits from an electronically generated list of such strings that was delivered to both the first electronic device and the first remote server or a cluster of servers by the second remote server or a cluster of servers at the time the individual registered for the ability to use this access method.

5. The method according to claim 1 wherein the third data consists of one of:

cipher data stored within one or more identity modules on the first device; and a unique cipher.

6. The method according to claim 1 wherein:

communication among the first electronic device, the first remote server or a cluster of servers, and the second remote server or a cluster of servers are encrypted with ciphering processes exploiting cipher data stored within subscriber identity modules on the devices.

7. The method according to claim 1 wherein:

the database consists of at least one of:

a public or private blockchain, public or private asset chain, or other public or private immutable distributed ledger technology; and a set of public or private asset chains.

8. The method according to claim 1 wherein:

the method terminates upon the occurrence of one of:

the first remote server or a cluster of servers do not acknowledge receipt of the first data within a predetermined time period after the first electronic device transmits the first data; or the first remote server fails to find a matching verification entry in the database; or the second remote server or a cluster of servers fail to find the account of the individual as identified in the second data.

9. A method of permitting an individual to access a registered account with an online service controlled by a third party by providing to the third party unique information that verifies the identity of the individual and the right to access the registered account, the method comprising:

providing to a first electronic device a first credential information relating to the individual associated with the first electronic device; the first credential information authorizing submission of a first message to a first remote server or a cluster of servers;

transmitting a first data from the first electronic device to a first remote server or a cluster of servers, the first data comprising the specification of the online service which the individual desires to access, and permission to transmit aspects of the individual's identity information to a second remote server or a cluster of servers associated with the third party;

transmitting a second data from the first electronic device to both the first remote server or a cluster of servers and the second remote server or a cluster of servers associated with the third party, the second data consisting of an account identifier associated with an account of the individual with the online service, and a unique cryptographically generated value for one-time use to access the online service;

transmitting a third data from the second remote server or a cluster of servers, to the first electronic device, the third data comprising information specifying additional aspects of the individual's identity information required by the third party to grant access to the online service;

transmitting a fourth data from the first electronic device to the first remote server or a cluster of servers, the fourth data comprising the additional aspects of the individual's identity information required by the third party and permission for the first remote server or a cluster of servers to transmit the aspects of the individual's identity information to the second remote server or a cluster of servers;

transmitting a fifth data from the first electronic device to the first remote server or a cluster of servers, the fifth data comprising additional credential information needed to complete independent verification of the aspects of the individual's identity information associated with the individual by the first remote server or a cluster of servers;

the first remote server or a cluster of servers cryptographically combining contents within the first data and fourth data with the additional credential information in the fifth data, and using the resulting combination to locate a matching verification entry in a database;

after locating such a match, transmitting a sixth data from the first remote server or a cluster of servers to the second remote server or a cluster of servers, the sixth data consisting of the additional aspects of the individual's identity information, evidence of independent verification of the aspects of the individual's identity information, and the unique cryptographically generated value transmitted in second data; and after verifying that the aspects of the individual's identity information received in sixth data is consistent with that of an online account belonging to the individual, and that the unique cryptographically generated value received from the first remote server or a cluster of servers in sixth data matches the unique cryptographically generated value received from the first electronic device in the second data, the second remote server or a cluster of servers grant access to the account of the individual using the first electronic device.

10. The method according to claim 9 wherein the aspects of identity information transmitted in any or all of the first data, the fourth data, and the sixth data represent at least one of:

an image of an identity document originally issued by the third party or a government authority;

a digital representation of an identity document originally issued by the third party or a government authority;

a privacy policy compliant redacted image of an identity document originally issued by the third party or a government authority;

a privacy policy compliant redacted digital representation of an identity document originally issued by the third party or a government authority; and a predetermined portion of identity data stored by the third party or government issuer of an identity document.

11. The method according to claim 9 wherein the fifth data consists of one of:

cipher data stored within one or more identity modules on the first device; and a unique cipher key stored on the first device.

12. The method according to claim 9 wherein the unique cryptographically generated value transmitted in second data is at least one of:

a randomly generated string of characters and/or digits of specified minimum length;

a first unused entry from a unique sequence of strings of characters and/or digits from an electronically generated list of such strings that was delivered to both the first electronic device and the second remote server or a cluster of servers by the first remote server or a cluster of servers at the time the individual registered for the ability to use this access method; or a first unused entry from a unique sequence of strings of characters and/or digits from an electronically generated list of such strings that was delivered to both the first electronic device and the first remote server or a cluster of servers by the second remote server or a cluster of servers at the time the individual registered for the ability to use this access method.

13. The method according to claim 9 wherein:

communication among the first electronic device, the first remote server or a cluster of servers, and the second remote server or a cluster of servers are encrypted with ciphering processes exploiting cipher data stored within subscriber identity modules on the devices.

14. The method according to claim 10, wherein:

the verification entries stored in the database or similar data storage entity consist of at least one of:

information stored by the third party or issuer of identity document(s) referred to in claim 10;

cryptographically secured representations of identity information verified by the third party and/or an issuer of an identity document referred to in claim 10; or cryptographically secured representations of identity information verified by another authority.

15. The method according to claim 9 wherein:

the database consists of at least one of:

a public or private blockchain, public or private asset chain, or other public or private immutable distributed ledger technology; and a set of public or private asset chains.

16. The method according to claim 9 wherein:

the method terminates upon the occurrence of one of:

the first remote server or a cluster of servers does not acknowledge receipt of the first data within a predetermined time period after the first electronic device transmits the first data; or the first remote server or a cluster of servers fails to find a matching verification entry in the database; or the second remote server or a cluster of servers fail to find the account of the individual as identified in the second data.

\* \* \* \* \*